US010960744B1

(12) United States Patent
Earl et al.

(10) Patent No.: US 10,960,744 B1
(45) Date of Patent: Mar. 30, 2021

(54) MULTI-DIRECTIONAL VEHICLE ROOF COVER SYSTEM

(71) Applicant: Zoox, Inc., Foster City, CA (US)

(72) Inventors: Anthony Earl, Foster City, CA (US); Christopher William Labadie, Redwood City, CA (US); Brandon Loeb, Campbell, CA (US); Timothy David Kentley-Klay, Stanford, CA (US); Marius Marquart, Ostfildern (DE); Patricia Josephine Malloy, Rochester Hills, MI (US); Jürgen Salewski, Rochester Hills, MI (US); Michael Heidan, Stuttgart (DE); Roberto Cabral, Troy, MI (US); Everardo Hernandez, Shelby Township, MI (US)

(73) Assignee: Zoox, Inc., Foster City, CA (US)

( * ) Notice: Subject to any disclaimer, the term of this patent is extended or adjusted under 35 U.S.C. 154(b) by 102 days.

(21) Appl. No.: 16/195,766

(22) Filed: Nov. 19, 2018

(51) Int. Cl.
*B60J 7/08* (2006.01)
*B60J 7/16* (2006.01)
*E05B 65/10* (2006.01)

(52) U.S. Cl.
CPC .................... *B60J 7/1642* (2013.01)

(58) Field of Classification Search
CPC .... B60J 7/08; B60J 7/16; B60J 7/1642; E05B 65/10; E05B 15/50; B64D 33/02; B60H 1/26; B60H 1/262
USPC ........................................................ 701/36
See application file for complete search history.

(56) References Cited

U.S. PATENT DOCUMENTS

| 4,412,404 | A  | * | 11/1983 | Manning | B60J 7/1642 |
|   |   |   |   |   | 52/19 |
| 4,929,019 | A  | * | 5/1990 | Paakkonen | B60J 7/1642 |
|   |   |   |   |   | 296/216.02 |
| 6,347,484 | B1 | * | 2/2002 | Swanger | B60J 7/1642 |
|   |   |   |   |   | 49/193 |
| 6,549,288 | B1 | * | 4/2003 | Migdal | G01B 11/25 |
|   |   |   |   |   | 356/601 |
| 6,572,182 | B2 | * | 6/2003 | Lamparter | B60J 7/1642 |
|   |   |   |   |   | 296/216.02 |

(Continued)

OTHER PUBLICATIONS

Glass Roof Hatch by GM Coachwork for use in wheelchair accessible vehicles and minibuses; YouTube video, published on Sep. 4, 2013; screenshots included; 5 pages; view at http://www.youtube.com/watch?v=5pJZSaSth_k.

*Primary Examiner* — Tan Q Nguyen
(74) *Attorney, Agent, or Firm* — Lee & Hayes, P.C.

(57) ABSTRACT

A system for a multi-directional roof cover system includes a vehicle comprising an opening in the top of the vehicle and a cover movably coupled to selectively cover the opening. The cover has a first end proximate a first end of the vehicle, a second end proximate a second end of the vehicle, lateral edges connecting the first end and the second end, and linkages coupling the lateral edges to the vehicle. The cover is actuatable, based on one or more conditions, between a first position in which the cover is closed and covers the opening, a second position in which the cover is open and the first end of the cover is raised relative to the second end of the cover, and a third position in which the cover is open and the second end of the cover is raised relative to the first end of the cover.

20 Claims, 11 Drawing Sheets

(56) References Cited

U.S. PATENT DOCUMENTS 7,014,144 B2 * 3/2006 Hein ................... B64D 33/02
                                                244/53 B
9,358,858 B2 * 6/2016 Song ................... B60J 7/1642

* cited by examiner

US 10,960,744 B1

MULTI-DIRECTIONAL VEHICLE ROOF COVER SYSTEM

BACKGROUND

Automotive sunroofs are common features on conventional automotive vehicles. Automotive sunroofs are operable to uncover an opening in a vehicle roof to allow light and/or fresh air to enter the passenger compartment. Automotive sunroofs are provided for conventional automotive vehicles in a variety of shapes, sizes, and styles. Conventional automotive sunroofs may slide and/or tilt to open. These conventional sunroofs are directional and are designed for vehicles that travel primarily in one direction.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
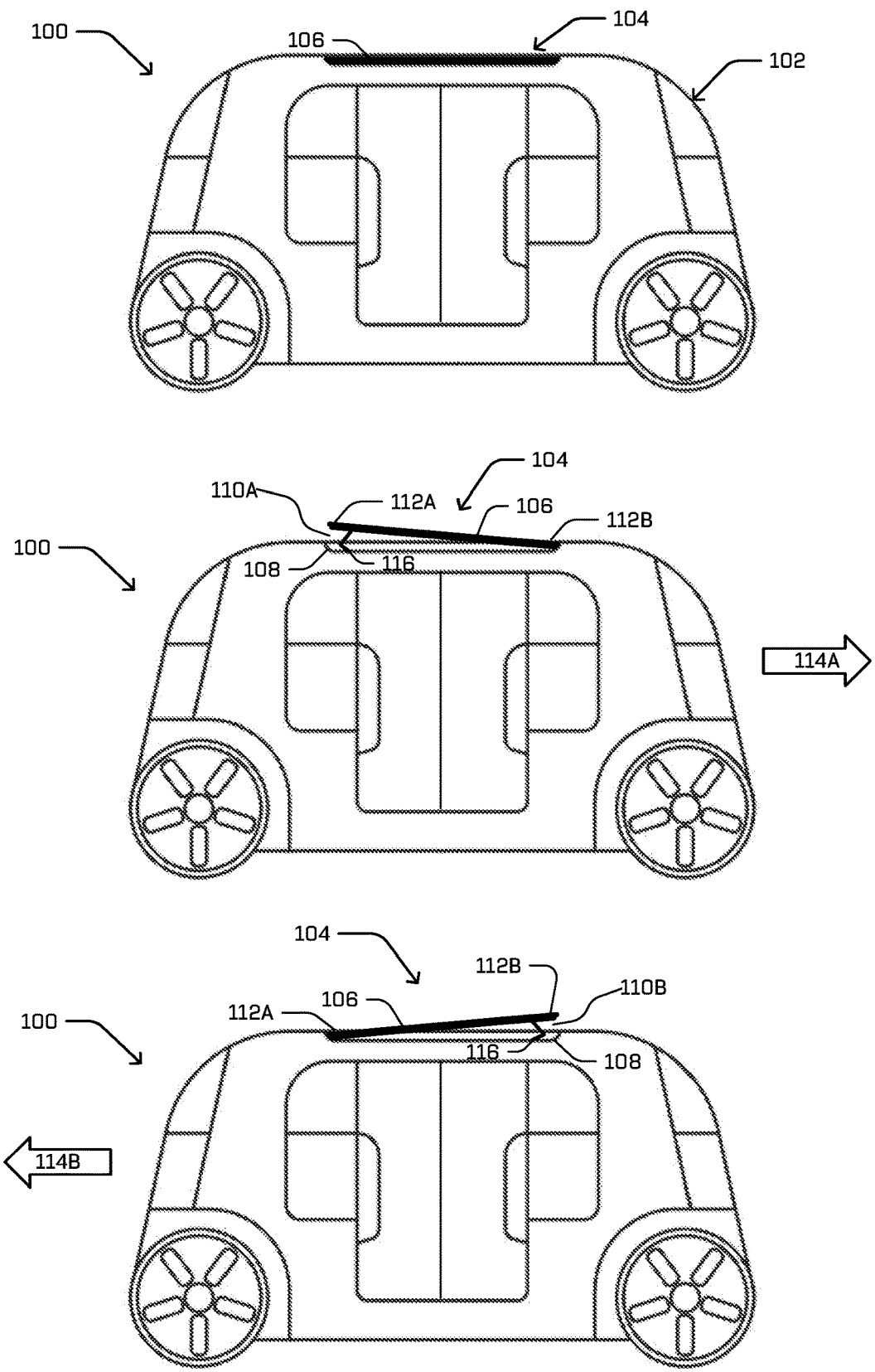
FIG. 1 is a schematic view of an example vehicle comprising a body and a multi-directional roof cover system located on a top of the vehicle, in accordance with embodiments of the disclosure.

As discussed above, traditional automotive sunroofs are directional. Some automotive sunroofs can be opened by raising a trailing edge of the sunroof, and thus creating a vent opening away from (or downstream of) the common direction of travel of the vehicle to prevent high forces of air from pushing against the covering of the sunroof and entering the vehicle. These traditional tilting automotive sunroofs are therefore not suitable for vehicles that regularly travel in multiple directions (e.g., bidirectional or multi-directional vehicles), especially at moderate or high speeds. As used herein, a bidirectional vehicle is one that is configured to switch between traveling in a first direction of the vehicle and a second, opposite, direction of the vehicle. In other words, there is no fixed "front" or "rear" of the vehicle. Rather, whichever longitudinal end of the vehicle is leading at the time becomes the "front" and the trailing longitudinal end becomes the "rear." A traditional tilting automotive sunroof would not be suitable for use in a bidirectional vehicle because the vent opening in the traditional sunroof would face the direction of travel (e.g., with a leading edge of the cover raised) as the vehicle travels in at least one direction. Operating a bidirectional or multi-directional vehicle with a traditional automotive sunroof with a leading edge raised would put a tremendous amount of pressure on the cover of the traditional automotive sunroof, and thus may cause damage to the traditional automotive sunroof, the vehicle housing the traditional automotive sunroof, or even endanger passengers within the vehicle.

This application describes a multi-directional vehicle roof cover system that delivers access to light and fresh air to a vehicle by providing at least two vent opening directions, rather than the one vent opening direction of traditional tilting automotive sunroofs. For instance, in some examples, the multi-directional vehicle roof cover system may selectively cause a vent opening to change based on a direction of travel of a bidirectional vehicle, such that the vent opening generally faces away from the direction of travel (e.g., with a trailing edge of the cover raised). Thus, passengers may enjoy the light and fresh air provided by the roof cover system as part of a bidirectional (or other multi-directional) vehicle. Further, the multi-directional vehicle roof cover does not require substantial increases to strength of materials of the roof cover system, or materials used to attach the roof cover system to the vehicle, to account for forces applied to the roof system when the vehicle travels in multiple different directions.

In some examples, a vehicle usable to implement the techniques described herein includes a body including a compartment with a first end, a second end opposite the first end, and a top. The compartment has an opening in the top, such as to accommodate a cover movably coupled to the body that selectively covers the opening in the compartment. The cover has a first end proximate the first end of the compartment, and a second end proximate the second end of the compartment.

The cover, in some examples, selectively provides vent openings in different directions to allow air and/or light to pass into and out of the compartment. For instance, in some examples, the cover may be movable between a first position, a second position, and a third position. In the first position, the cover is closed (e.g., both leading and trailing edges of the cover are lowered) and covers the opening in the compartment. In the second position the cover is open, and the first end of the cover is raised relative to the second end of the cover, thus providing a vent opening at the first end of the cover between the compartment and an exterior of the vehicle. Additionally, in the third position the cover is also open, and the second end of the cover is raised relative to the first end of the cover. The third position thus may provide a vent opening at the second end of the cover, opposite a direction of the vent opening of the second position.

The cover may also have lateral edges spanning between the first end of the compartment and the second end of the compartment (e.g., forming a rectangular shape, though other any other shape is contemplated). Linkages may be disposed at the lateral edges of the cover to couple the lateral edges of the cover to the vehicle body. In some examples, each lateral side of the cover may be coupled to the vehicle by a pair of linkages. In such examples, the cover may be coupled to the vehicle body by four linkages. The pair of linkages on each side of the vehicle may be coupled to one another by a connecting rod such that the pair of linkages on each side of the vehicle move in tandem. However, in other examples, such as when the frame is continuous, the linkages on each lateral side may be coupled together in other manners or may formed integrally as a single linkage spanning all or a portion of a length of the respective lateral side of the cover. The linkages on the first lateral edge of the cover may be positioned substantially symmetrically to (i.e., as mirror images of) the linkages on the second lateral edge of the cover with respect to a longitudinal axis of the vehicle body. Additionally or alternatively, the linkages proximate the first longitudinal end of the cover may be positioned substantially symmetrically to (i.e., as mirror images of) the linkages proximate the second longitudinal of the cover with respect to a latitudinal axis of the vehicle body.

One or more of the linkages that couple the lateral edges of the cover to the vehicle body may include a slotted bracket and a link. In some examples, the slotted bracket moves along a track proximate a respective lateral edge of the cover to selectively actuate the cover between various positions. For instance, when the cover is in the first position (e.g., the "closed" position), the slotted bracket is in a first position with respect to a linkage. When the cover is in the second position (e.g., one of the "open" positions), the slotted bracket is in a second position with respect to the linkage, where the second position of the slotted bracket is closer to the first end of the cover than the first position of the slotted bracket. When the cover is in the third position (e.g., a different one of the "open" positions), the slotted bracket is in a third position with respect to the linkage, and the third position of the slotted bracket is closer to the second end of the cover than the first position of the slotted bracket. Moving the slotted bracket along the track causes the cover to actuate between the first position, the second position, and the third position depending upon the position of the slotted bracket on the track.

As discussed above, one or more of the linkages that couple the lateral edges of the cover to the vehicle body may also include a link. The link may be angled and include a first leg that is pivotably coupled to a lateral side of the cover, allowing the cover to rotate with respect to the link. The link may also have a second leg, which is pivotably and slidably coupled to the slotted bracket such that the sliding bracket can slide relative to the second leg of the link and the second leg of the link can rotate relative to the sliding bracket. Additionally, the link may include a pivot disposed between the first leg and the second leg that is pivotably coupled (e.g., pin connected) to the body of the vehicle, allowing the link to rotate with respect to the body of the vehicle. In some cases, the pivot may be positioned within an additional track (e.g., located on a frame of the vehicle) that allows the pivot to move vertically with respect to the body of the vehicle as the link moves along a slot in the slotted bracket. By allowing the pivot to move vertically with respect to the body of the vehicle, the link causes a leading edge of the cover to remain above an opening of the multi-directional roof cover system, regardless of a position of the opposite trailing end of the cover. The shape and features of the link may cause the first end of the cover and alternately the second end of the cover to move vertically relative to the vehicle body as the slotted bracket translates between the first position, second position, and third position with respect to the linkage. Further, the linkages may be coupled to a motor in order to selectively actuate the cover to move between the various positions. In some examples, the motor is coupled to one or more of the linkages by one or more cables that push and pull one or more of the linkages, such as pushing and pulling one or more of the slotted brackets, causing the cover to move between the various positions. In some examples, a single motor may be used to transition the cover between the first, second, and third positions. For instance, the single motor may simultaneously push a pair of cables to move the cover in a first direction from a closed position to a first option position, and may simultaneously pull the pair of cables to move the cover in a second direction opposite the first direction to transition the cover a second option position. The vehicle may also include a safety system communicatively coupled to the motor to prevent the cover from closing while the opening is obstructed. For example, the safety system may include a touch sensor disposed along at least a portion of a perimeter of the opening, such as to detect an object in contact with the opening and prevent the cover from closing on the object. By way of example and not limitation, the touch sensor may include one or more pressure sensors, capacitive sensors, strain gauges, or the like. Alternatively or additionally, the safety system may include a current monitor that measures a current applied to the motor to actuate the cover to move. The current monitor may detect overcurrent conditions such as may arise if the opening is obstructed or an object is resisting motion of the cover. Additionally or alternatively, the safety system may receive input from a vision system of the vehicle indicating obstructions of and/or motion in the vicinity of the opening.

The vehicle may also include a vehicle computing device to control operation of different aspects of the vehicle. The vehicle computing device, in some examples, may control the vehicle to operate in a first mode in which the first end of the compartment is the leading end of the compartment relative to a direction of travel, and the second end of the compartment is a trailing end of the compartment relative to the direction of travel. In the first mode, the cover may be in the third position, where the second end of the cover is raised relative to the first end of the cover. In other words, the first mode causes the second edge of the cover, which in the first mode is the trailing edge, to be raised such that the vent opening faces away from a direction of travel.

The vehicle computing device may determine a change in a direction of travel of the vehicle, such as a direction opposite of the first direction of travel when the vehicle was operating in the first mode. The vehicle computing device controls the vehicle to operate in a second mode, in which the second end of the compartment is the leading end of the compartment, and the first end of the compartment is the trailing end of the compartment. Based on controlling the vehicle to operate in the second mode, the vehicle computing device may actuate the cover to move from the third position to the second position, in which the first end of the cover is raised relative to the second end of the cover. That is, the second mode causes the first edge of the cover, which in the second mode is the trailing edge, to be raised, and the second edge of the cover, which in the second mode is the leading edge, to be lowered, such that the vent opening faces away from the second direction of travel when the vehicle is operating in the second mode. In this way, the vehicle computing device automatically maintains an opening in the roof of the vehicle to allow light and fresh air to enter the vehicle, while maintaining the direction of the vent opening to face away from the direction of travel of the vehicle. Therefore, the vehicle can move at moderate to high speeds in at least two opposing directions and maintain a vent opening without placing large amounts of force on the cover from approaching air.

Furthermore, the vehicle computing device may detect a condition associated with the vehicle from one or more sensors, settings of the vehicle, notifications, and so forth. Some example conditions include precipitation, a speed of the vehicle exceeding a threshold speed, a direction of travel of the vehicle, a setting of an HVAC (heating, ventilation or air conditioning) system of the vehicle, a temperature within the compartment, a command received from a passenger of the vehicle, exit of a passenger from the vehicle, and so on. The vehicle computing device may, based on the detection of a condition, actuate the cover to move from one position to another. For instance, responsive to detecting precipitation, exceeding a speed threshold, or other condition, the vehicle computing device may actuate the cover to move from the second position or third position (e.g., one of the open positions) to the first position (e.g., the closed position). As another example, responsive to a setting of an HVAC system, a temperature within the compartment, a command from a passenger, or other condition, the vehicle computing device may actuate the cover to move from the first position to one of the second position or third position. In still other examples, responsive to the detecting a change in direction of travel of the vehicle, the vehicle computing device may actuate the cover to move from the second position to the third position, or vice versa.

These and other aspects are described further below with reference to the accompanying drawings. The drawings are merely example implementations and should not be construed to limit the scope of the claims. For example, while some example vehicles are shown and described as being autonomous vehicles that are capable of navigating between locations without human control or intervention, techniques described herein are also applicable to non-autonomous and/or semi-autonomous vehicles. Also, while the vehicle is illustrated as having a coach style body compartment, other body configurations are contemplated. Body compartments configured to accommodate any number of one or more passengers (e.g., 1, 2, 3, 4, 5, 6, 7, 8, 9, 10, 20, 100, etc.) are contemplated. Additionally, while the example body compartments shown include a passenger compartment, in other examples the body compartment may comprise a compartment for purposes other than passengers (e.g., in the case of a cargo vehicle, delivery vehicle, construction vehicle, etc.). Also, while example bidirectional vehicles are shown and described, the techniques described herein are also applicable to traditional unidirectional vehicles and other multi-directional vehicles. In the case of other multi-directional vehicles, the vehicle roof cover system may be configured to open in any number of different opening directions and/or positions depending on the direction of travel of the vehicle. For instance, in the case of a quad-directional vehicle, a vehicle roof cover system may include a rectangular cover configured to open in four different open positions (e.g., each of four edges of the cover may be independently raised to enable whichever edge of the cover is the trailing edge of the cover to be raised or otherwise opened, regardless of the direction of travel of the vehicle).

Example Multi-Directional Roof Cover System Architecture

FIG. 1 is a schematic view of an example vehicle 100 comprising a body 102 and a multi-directional roof cover system 104 located on a top of the vehicle. FIG. 1 illustrates the multi-directional roof cover system 104 in a closed orientation (at the top of the page), a first open orientation (at the middle of the page), and a second open orientation (at the bottom of the page). The multi-directional roof cover system 104 may include a cover 106, which may be configured to cover an opening 108 in the top of the vehicle. The cover 106 may be constructed from a variety of one or more materials, such as glass and/or acrylic to provide a transparent, semi-transparent, or translucent covering of the opening. Alternatively or additionally, the cover 106 may be constructed from metal, polymer, and/or wood, to name a few examples, thus providing an opaque covering of the opening 108. While the description herein generally relates to an opening in a top of a vehicle, the multi-directional roof cover system may also be implemented in other parts of a vehicle, such as a side, front, back, bottom, and so forth.

When the multi-directional roof cover system 104 is in the closed orientation, the cover 106 is in a closed position, such that the cover covers the opening 108 in the top of the vehicle 100. For example, the cover 106 may seal an interior compartment of the vehicle 100, preventing air, water, and other particles from entering the interior compartment of the vehicle through the opening 108. In some cases, where at least a portion of the cover 106 includes a glass or other transparent material, the cover may further include a shade (not pictured) to prevent light from entering the interior compartment of the vehicle through the opening 108 when the shade is closed. The shade, when provided, may be moveable in concert with or independently of the cover 106.

The opening 108 may provide a passage, such as by way of a vent opening 110A or 110B, from the exterior of the vehicle 100 to an interior compartment of the vehicle, allowing air and light to enter and exit the opening when the cover 106 is open. In the first open orientation (the middle of the page), the cover 106 is in a first open position with one end 112A of the cover raised relative to another end 112B of the cover. The first open position may be associated with the vehicle 100 traveling in a direction 114A away from a direction of the vent opening 110A. In the second open orientation (the bottom of the page), the cover 106 is in a second open position with one end 112B of the cover raised relative to the other end 112A of the cover. The second open position may be associated with the vehicle 100 traveling in a direction 114B away from a direction of the vent opening 110B.

The cover 106 may be actuated between the various positions, for instance the closed position and the two open positions pictured, using one or more linkages 116 located on lateral sides of the cover. The linkages 116 couple the lateral edges of the cover 106 to the body 102, securing the cover 106 to the body 102 in each of the various positions. The linkages 116 may facilitate a trailing edge of the cover 106 to be elevated or raised relative to a front edge of the cover 106. Alternatively or additionally, the linkages 116 may facilitate the trailing edge of the cover 106 to be raised relative to a roof of the vehicle body 102. In some examples, the linkages 116 are coupled to a motor to selectively actuate the cover 106 to move between the closed position and the two open positions, such as based on the directions of travel 114A and 114B and/or one or more other conditions described in more detail below.

Further, the linkages 116 may allow the cover 106 to tilt and provide the vent openings 110A and 110B in the open positions without the leading edge of the cover that faces the direction of travel (114A and 114B, respectively) rotating below the opening 108. In other words, the linkages 116 may allow the respective leading edges of the cover 106 to remain substantially flush with the roof of the vehicle body 102 as the cover rotates to raise the trailing edge of the cover and provide the vent openings 110A and 110B. This may prevent the leading edge of the cover from passing through the opening 108 into the body 102 of the vehicle 100, thereby minimizing a depth or thickness of the multi-directional roof cover system 104, and allowing the leading edges of the cover to remain at approximately a same height as when the cover is in the closed position.

Figure 2:
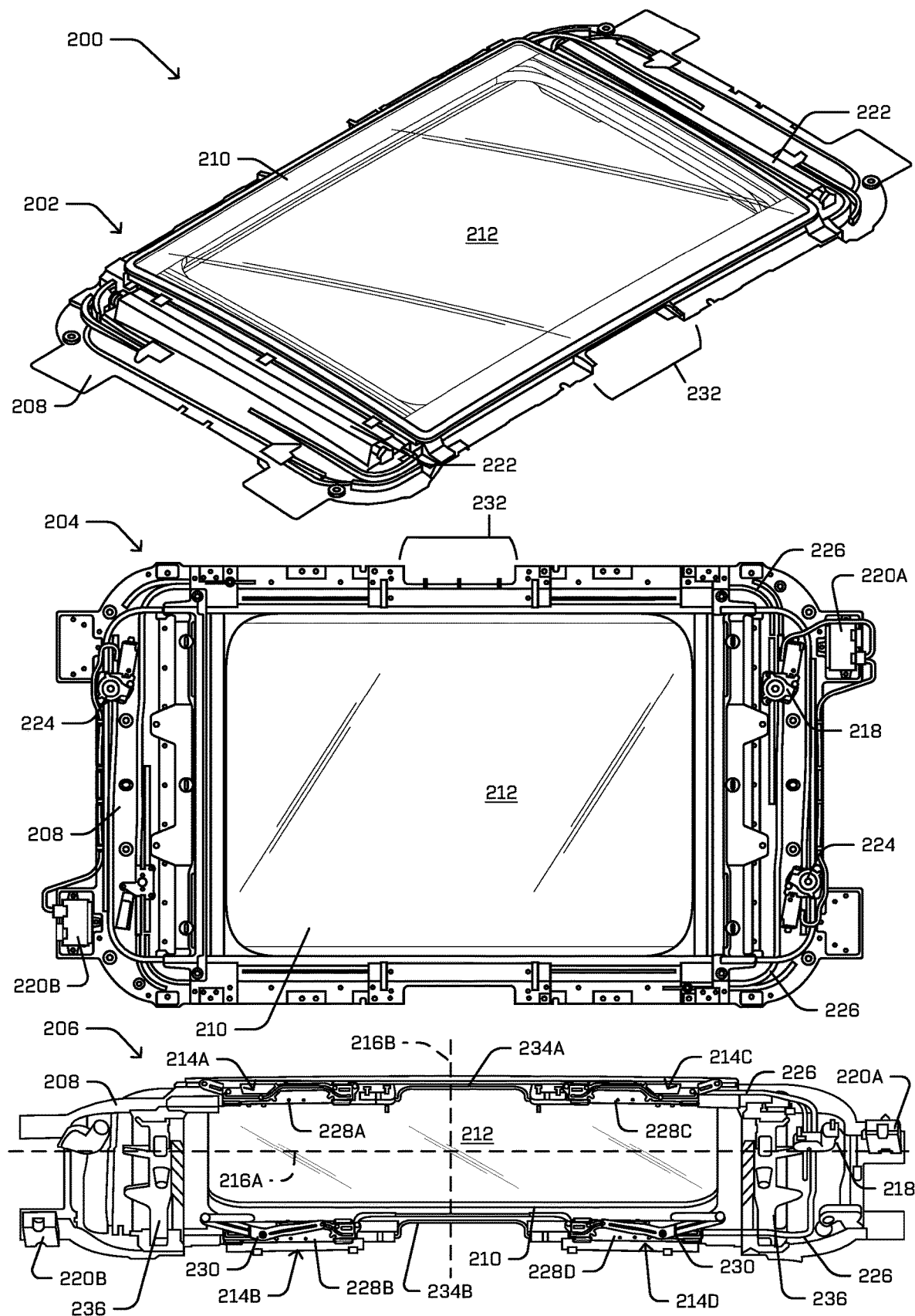
FIG. 2 depicts various features of an example multi-directional roof cover system in a top view, a bottom view, and an angled-bottom view, in accordance with embodiments of the disclosure.

FIG. 2 depicts an example multi-directional roof cover system 200 in a top view 202, a bottom view 204, and an angled-bottom view 206. The multi-directional roof cover system 200 in the three views 202, 204, and 206 is shown removed from a vehicle to depict various features of the multi-directional roof cover system 200. In this example, the multi-directional roof cover system 200 does include a frame 208 of a vehicle body to which the multi-directional roof cover system 200 mounts. The frame 208 may comprise a roof portion of the vehicle. The frame 208 may surround the multi-directional roof cover system 200 partially or wholly, and provide locations to mount components of the multi-directional roof cover system 200 such as a motor, sensors, computing device components, safety components, and so forth. In some examples, the frame 208 may comprise a split frame having a gap or recess 232 in the lateral sides of the frame 208. The gap or recess 232 may accommodate one or more other features or components of the vehicle, such as a cross-member (not shown), one or more airbags, one or more ducts or vents of an HVAC system, one or more lights, one or more speakers, or the like. In some examples, the frame 208 may include traverses 236 disposed at longitudinal ends of the frame 208. The traverses 236, when provided, may comprise one or more openings or recesses to accommodate air ducts and/or vents, to couple to a headliner of the vehicle, and/or to mount tensioners for one or more sunshades.

In this example, the multi-directional roof cover system 200 includes a cover 210 having a transparent portion 212, which may be comprised of glass and/or acrylic materials, for instance. In one example, the transparent portion may be made of Gorilla Glass® by Corning Incorporated. As shown in the angled-bottom view 206, the multi-directional roof cover system 200 may include linkages 214A-D that couple or otherwise attach the cover 210 to the vehicle, such as by attaching the cover 210 to the frame 208. The linkages 214A-D may be located proximate longitudinal ends of the cover 210. In the illustrated example, the linkages 214A-D are substantially symmetric about a longitudinal axis 216A of the cover 210 and about a latitudinal axis 216B. In other words, the linkage 214A is a mirror image of the linkage 214B, and the linkage 214C is a mirror image of the linkage 214D with respect to the longitudinal axis 216A, and the linkage 214A is a mirror image of the linkage 214C, and the linkage 214B is a mirror image of the linkage 214D with respect to the latitudinal axis 216B. However, in other examples, the linkages need not be symmetric about the longitudinal and/or latitudinal axes.

Further, as shown in the bottom view 204 and the angled-bottom view 206, the multi-directional roof cover system 200 may include a motor 218, coupled to one or more of the linkages 214A-D, to selectively actuate the cover 210 to move between various positions. The motor may be controlled by a motor controller 220A. In some examples, the motor controller 220A may also control additional components of the vehicle such as one or more shades for the multi-directional roof cover system 200. However, in the illustrated example, a second motor controller 220B may be provided to control one or more shades for the multi-directional roof cover system 200. Although shown in a retracted state for clarity, a retractable shade may selectively cover all or part of the transparent portion 212 to limit an amount of light allowed to enter the vehicle. In the example shown, the shade is retracted into shade compartments 222, but may be controlled to extend and retract by one or more shade motors 224 controlled by one or more of the motor controllers 220A and 220B.

One or more cables 226 may be used to couple the motor 218 to one or more of the linkages 214A-D. In the illustrated example, a single motor 218 is used to actuate the cover to move in both directions. However, in other examples, multiple motors could be used (e.g., one motor to actuate the cover in each direction, one motor for each side of the cover, one motor for each linkage of the cover, etc.). In the illustrated example, the cable(s) 226 may be, for instance, relatively stiff coils that are flexible enough to bend around corners of the multi-directional roof cover system 200 but are axially inelastic (i.e., does not significantly extend or contract). The cable(s) 226 may be disposed within sheath(s) that allow the cable 226 to move axially within the sheath.

The cable(s) 226 may attach to slotted brackets 228A-228D (collectively referred to as "slotted brackets 228") included as part of the linkages 214A-D. The slotted brackets 228 may be positioned such that the slotted brackets slide "back and forth" along a track included as part of the frame 208. In this example, the motor 218 may selectively cause the cable(s) 226 to push and/or pull one or more of the slotted brackets 228, thus causing the slotted brackets to move along the track included in the frame 208. The cable(s) 226 in this example are sufficiently stiff to cause the slotted brackets 228 to move without stretching or compressing the cable(s). As the slotted brackets 228 move along the track included in the frame 208, a link portion 230 of the linkages 214 rotates, causing one end of the cover 210 to raise, while an opposite end of the cover is lowered and/or remains at an approximately same height, as discussed in more detail below. The slotted brackets 228A and 228C on the first lateral side of the cover 210 are coupled together by a first connecting rod 234A, and the slotted brackets 228B and 228D on the second lateral side of the cover 210 are coupled together by a second connecting rod 234B. The connecting rods 234A and 234B are configured to span the gap or recess 232 disposed along the lateral edges of the frame 208. Because the slotted brackets 228 on each lateral side of the cover 210 are coupled by a connecting rod, they are configured to move in unison. In some examples, two cables 226 may be used, with one cable connected to a linkage on one lateral side of the cover and another cable connected to a linkage on the other lateral side of the cable. For instance, in the illustrated example, a first cable 226 couples to slotted bracket 228C and another cable 226 couples to slotted bracket 228D. The cables 226 in this example are configured such that actuation of motor 218 rotates a sprocket (not shown) that causes both cables 226 to be pushed (i.e., extended) or pulled (i.e., retracted) in unison. That is, actuation of the motor 218 in a first rotational direction causes both cables 226 to be pushed to move the cover 210 in a first direction (to the left in FIG. 2), and actuation of the motor 218 in a second (opposite) rotational direction causes both cables 226 to be pulled to move the cover 210 in a second direction (to the right in FIG. 2).

Figure 3:
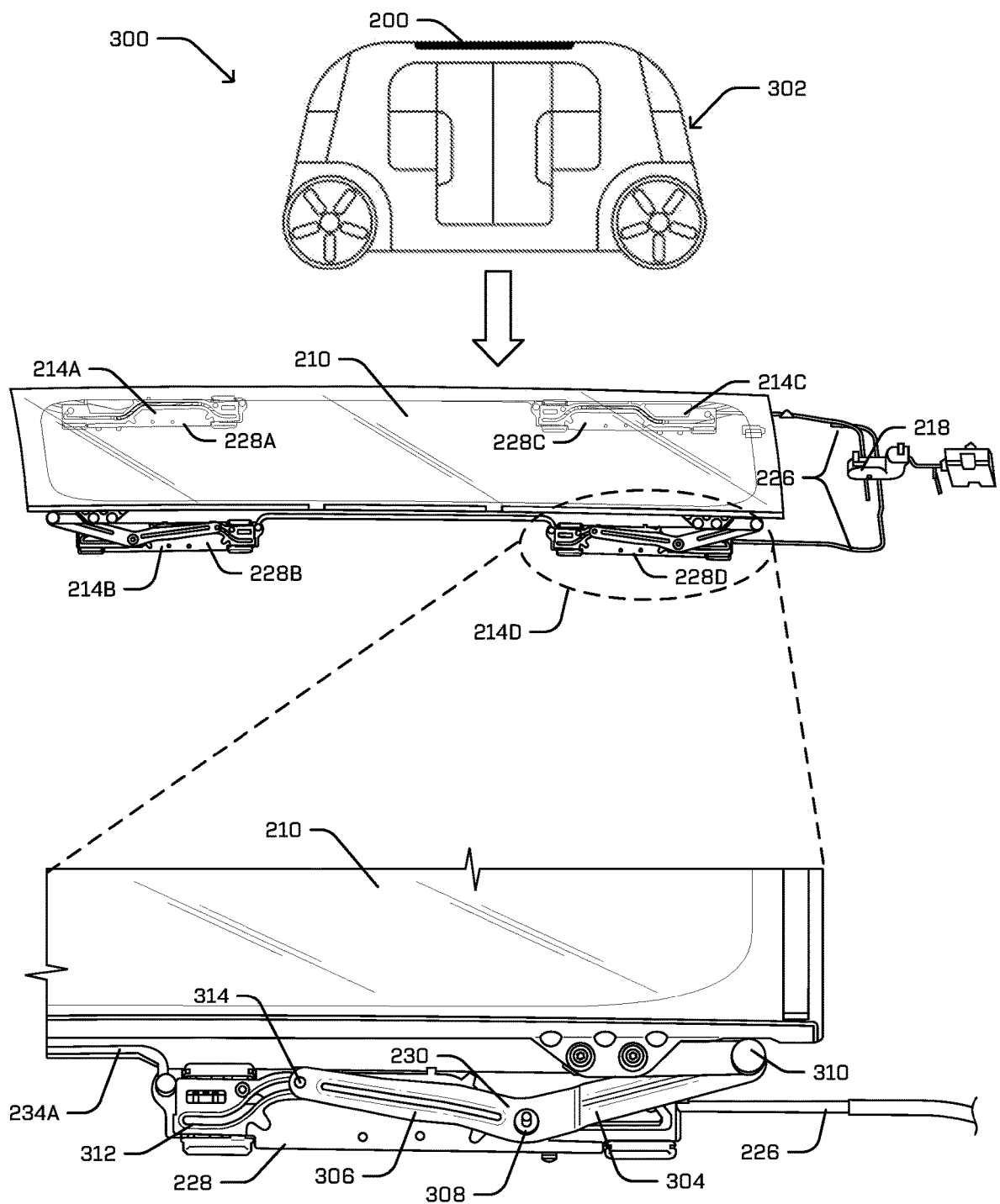
FIG. 3 is an example system depicting various views of the multi-directional roof cover system of FIG. 2 mounted to a vehicle in a closed position, in accordance with embodiments of the disclosure.

FIG. 3 is an example system 300 depicting various views of the multi-directional roof cover system 200 of FIG. 2 mounted to a vehicle 302 in a closed position. The multi-directional roof cover system 200 in this example includes the linkages 214A-214D that couple lateral edges of the cover 210 of the multi-directional roof cover system to a body of the vehicle 302. In the depicted position, the cover 210 is closed and covers an opening in an interior compartment of the vehicle 302. Therefore, the cover 210 may prevent air, light, precipitation, and other particles from entering the interior compartment of the vehicle 302 in this position.

As discussed in reference to FIG. 2, the multi-directional roof cover system 200 may include a motor 218 coupled to one or more of the linkages 214A-214D to selectively actuate the cover 210 to move between various positions. The motor 218 may be coupled to one or more of the linkages 214A-214D by the cables 226 that push and/or pull the cover to move between various positions. The cables 226 may be stiff enough to push and/or pull the cover to move between the various positions, while being flexible enough to maneuver around the corners of the multi-directional roof cover system 200 on a sheathed path from the motor 218 to the linkages 214A-214D.

To execute such movement, the linkages 214A-214D may each respectively include a slotted bracket 228A-228D, respectively, that moves along a track affixed to a body of the vehicle 302. The track may be positioned proximate to the lateral edges of the cover 210, such that the track runs parallel to the lateral edges of the cover. Accordingly, as the slotted brackets 228 move along the track, the cover moves towards a front or rear of the vehicle 302, and is restrained from side-to-side movement with respect to the vehicle. However, examples are contemplated in which the cover may move from side-to-side, having a track and slotted brackets oriented correspondingly.

Each of the respective linkages 214A-214D may further include a link 230 movably coupled to the respective slotted bracket 228. For example, the links 230 may be angled, having a first leg 304, a second leg 306, and a pivot 308 disposed between the first leg and the second leg. The first leg 304 may be pivotably coupled to a lateral side of the cover 210, such as by a hinge 310. The hinge 310 may allow the link 230 to rotate at the attachment point between the link and the cover 210, and cause the cover to rotate accordingly, such as to lift or lower with respect to the vehicle 302.

The second leg 304 of the link 230 may be pivotably and slidably connected to the slotted bracket 228. For instance, each of the respective slotted brackets 228 may include a slot 312 enclosed within the slotted bracket, along which the link 230 slides as the slotted bracket moves among the various positions. In this example, the link 230 includes two pins, a first pin 314 and a second pin located at the pivot 308. The first pin 314 and the second pin located at the pivot 308 are inserted through the slot 312, allowing the link 230 to slide according to the path of the slot as the slotted bracket 228 moves along the track. As the slot 312 is not comprised of an entirely straight path in this example, the link 230 not only slides along the path of the slot but also pivots according to the changes in direction of the path.

The pivot 308 is further coupled to the body of the vehicle 302, which may limit the link 230 to rotational movement, in some examples. However, in some embodiments, the pivot 308 may be positioned within an additional track or slot (not visible in this figure, which is located on the frame 208) that allows the pivot 308 to move vertically with respect to the body of the vehicle 302 as the link 230 moves along the slot 312 in the slotted bracket 228. By allowing the pivot 308 to move vertically with respect to the body of the vehicle 302, the link 230 causes a leading edge of the cover 210 to remain above an opening of the multi-directional roof cover system 200, regardless of a position of the opposite trailing end of the cover. The pivot 308 is also pivotably coupled to the body of the vehicle 302, thus allowing the link 230 to rotate with respect to the vehicle as the cover 210 moves between the various positions.

Figure 4:
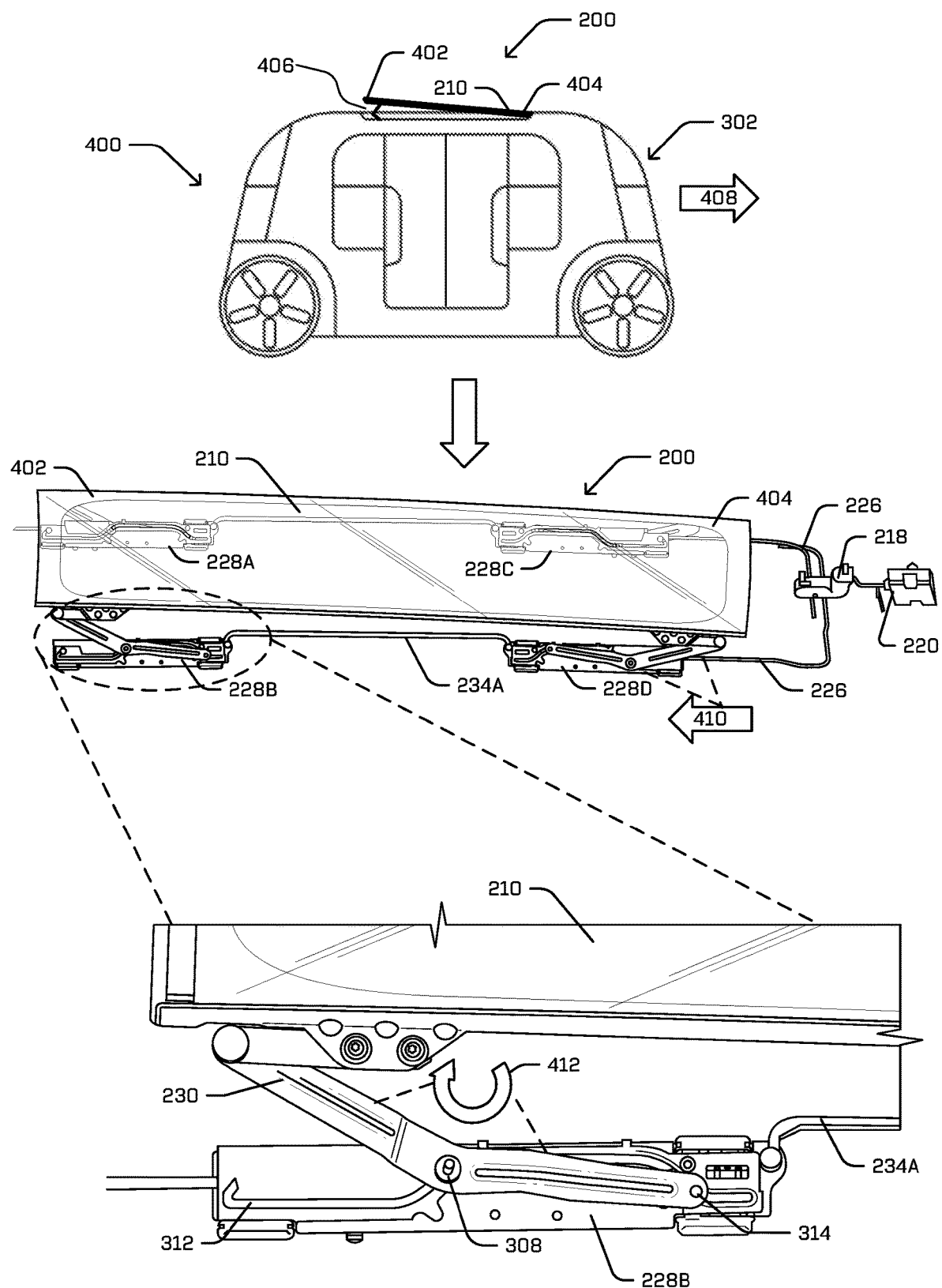
FIG. 4 is an example system depicting various views of the multi-directional roof cover system of FIG. 2 mounted to a vehicle in a first open position, in accordance with embodiments of the disclosure.

FIG. 4 is an example system 400 depicting various views of the multi-directional roof cover system 200 of FIG. 2 mounted to the vehicle 302 in a first open position. In the first open position shown, the cover 210 is open, and a first end of the cover 402 is raised relative to a second end of the cover 404. The cover 210 may consequently provide a vent opening 406 at the second end of the cover 404. The vent opening 406 may be directed away from a direction of travel 408 of the vehicle 302 to prevent high forces of air from pushing against the cover 210 and entering a compartment inside of the vehicle.

When the cover 210 is in the first open position, one or more of the slotted brackets 228 are translated from the location indicated in FIG. 3 where the cover was in the closed position to a position closer to the second end 404 of the cover. In other words, one or more of the slotted brackets 228 moves away from the first end 402 of the cover 210, and away from the vent opening 406. As discussed above, in the illustrated example, the slotted brackets 228A and 228C are connected by connecting rod 234A for movement in unison, and slotted brackets 228B and 228D are connected by connecting rod 234B for movement in unison. Thus, the slotted brackets 228 may slide along the track located proximate to respective lateral edges of the cover as mentioned above. To generate the motion of the slotted brackets 228, the motor 218 may push the cable 226 in a direction 410 towards the first end of the cover 402, thus causing the slotted brackets 228 to slide in unison along the tracks on respective lateral edges of the cover 210 in the direction towards the first end of the cover 402.

One or more of the pivots 308 may be attached to the body of the vehicle 302 to prevent the respective links 230 from moving in the direction 410 towards the first end 402 of the cover 308 as the slotted brackets 228 move. However, as mentioned above, the pivot 308 may be pivotably coupled to the body of the vehicle 302, thus permitting the link 230 to rotate in a clockwise direction 412 as the slotted bracket 228 moves towards the first end 402 of the cover 210. When the slotted bracket 228 is pushed towards the first end 402 of the cover 210, the pivot 308 and the first pin 314 travel along the path of the slot 312. Although the pivot 308 and the first pin 314 may be prevented from moving in a lateral direction proximate the attached edge of the cover 210, the pivot 308 and the first pin 314 may move vertically according to the path of the slot 312 along with pivoting in the clockwise direction 412. As the link 230 rotates in the clockwise direction 412, the first end 402 of the cover moves vertically upward relative to second end 404 of the cover and relative to the body of the vehicle 302, creating the vent opening 406 allowing light and air to enter an interior compartment of the vehicle.

Figure 5:
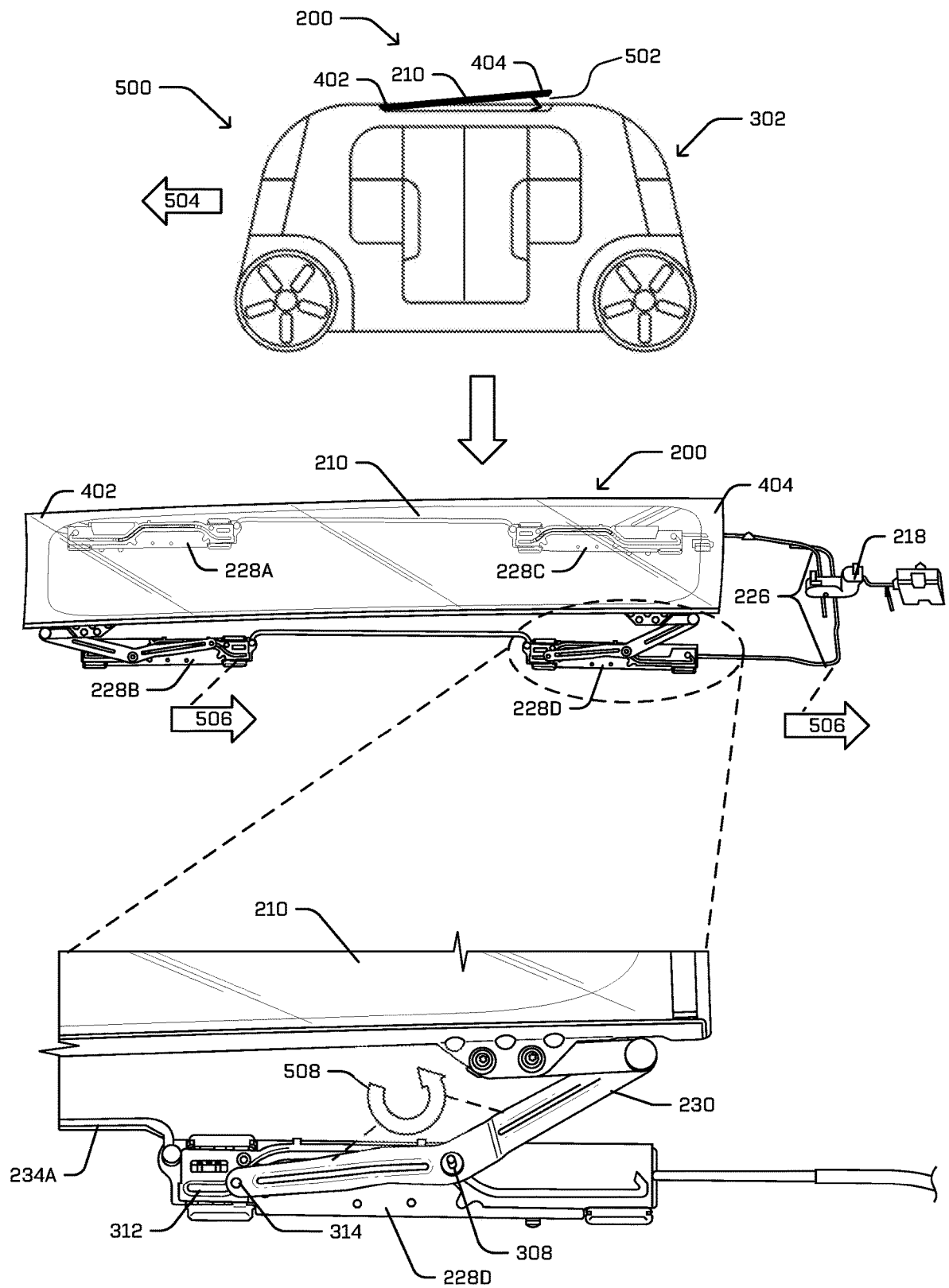
FIG. 5 is an example system depicting various views of the multi-directional roof cover system of FIG. 2 mounted to the vehicle in a second open position, in accordance with embodiments of the disclosure.

FIG. 5 is an example system 500 depicting various views of the multi-directional roof cover system 200 of FIG. 2 mounted to the vehicle 302 in a second open position. In the second open position shown, the cover 210 is open, with the second end of the cover 404 described in FIG. 4 being raised relative to the first end of the cover 402. The cover 210 may consequently provide a vent opening 502 at the second end 404 of the cover. The vent opening 502 may be directed away from a direction of travel 504 of the vehicle 302 to prevent high forces of air from pushing against the cover 210 and entering a compartment inside of the vehicle.

When the cover 210 is in the second open position, one or more of the slotted brackets 228 are translated from the location indicated in FIG. 3 where the cover was in the closed position to a position closer to the second end 404 of the cover 210. In other words, one or more of the slotted brackets 228 moves away from the first end 402 of the cover 210, and toward from the vent opening 502. To do so, the slotted brackets 228 may slide along the tracks located proximate to respective lateral edges of the cover 210 as mentioned above. To generate the motion of the slotted brackets 228 in this example, the motor 218 may pull the cables 226 in a direction 506 towards the second end 404 of the cover, thus causing the slotted brackets 228 to slide along the tracks on the lateral edges of the cover 210 in the direction towards the second end 404 of the cover 210.

Similar to the discussion above, one or more of the pivots 308 may be attached to the body of the vehicle 302 to prevent the respective links 230 from moving in the direction 506 towards the second end 404 of the cover 210 as the slotted brackets 228 move. However, as mentioned above, the pivot 308 may be pivotably coupled to the body of the vehicle 302, thus permitting the link 230 to rotate in a counter-clockwise direction 508 as the slotted bracket 228 moves towards the second end 404 of the cover 210. When the slotted bracket 228 is pushed towards the second end 404 of the cover 210, the pivot 308 and the first pin 314 travel along the path of the slot 312. Although the pivot 308 and the first pin 314 may be prevented from moving in a lateral direction proximate the attached edge of the cover 210, the pivot 308 and the first pin 314 may move vertically according to the path of the slot 312 along with pivoting in the counter-clockwise direction 508. As the link 230 rotates in the counter-clockwise direction 508, the second end 404 of the cover moves vertically upward relative to the first end of the cover 402 and relative to the body of the vehicle 302, creating the vent opening 502 allowing light and air to enter an interior compartment of the vehicle.

Figure 6:
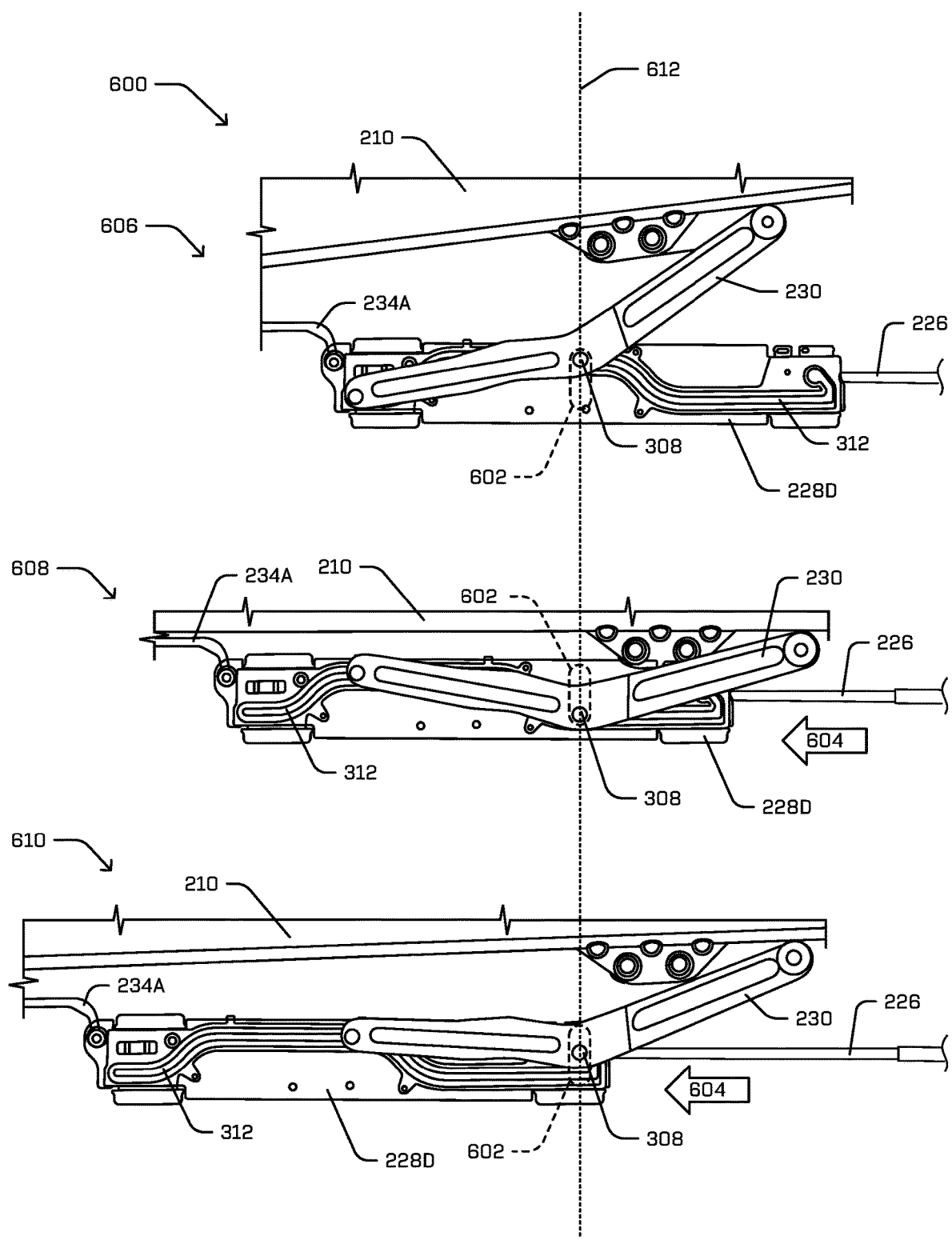
FIG. 6 is an example system schematically depicting a linkage of the multi-directional roof cover system of FIG. 2 in various positions in accordance with embodiments of the disclosure.

FIG. 6 is an example system 600 depicting the linkage 228D of the multi-directional roof cover system of FIG. 2 in various positions in accordance with embodiments of the disclosure. The example system 600 includes an indication of a slot 602, which may be part of the frame 208 of FIG. 2. In this figure, the frame is omitted for clarity but the slot 602 thereof is shown in dashed lines. The slot 602 may permit the second pin located at the pivot 308 of the link 230 to move at least vertically as the slotted bracket 228D is pushed and/or pulled to actuate the cover 210 of the multi-directional roof cover system. Although the slot 602 is shown as a vertical "pill" (e.g., rounded rectangular) shape, any suitable shape may be used for the slot 602, such as angled slot, arced slot, and so forth, as long as the slot allows the pivot 308 to translate vertically. The second pin located at the pivot 308 protrudes from the link 230 through the slot 602, affixing the link to the frame 208 (not pictured), while also extending through and sliding in the slot 312 in the slotted bracket 228D.

For example, the slotted bracket 228D is shown in FIG. 6 in a sequence of positions. Beginning with the position 606 shown at the top of FIG. 6, the slotted bracket 228D is shown in a first open position, in which the slotted bracket 228D is in a right-most position and an end of the cover 210 proximate slotted bracket 228D (the right end in FIG. 6) is elevated relative to an opposite end of the cover 210 distal from the slotted bracket 228D (the second end of the cover is not visible in FIG. 6). The slotted bracket 228D may be pushed by the cable 226 in a direction 604 (to the left in FIG. 6), while the link 230 remains stationary in the longitudinal direction, thus causing the cover 210 to move from the first open position shown at 606 to a closed position shown at 608. Actuating the motor to cause the cable 226 to push the slotted bracket 228D further in the direction 604 (to the left in FIG. 6) causes the cover 210 to move from the closed position shown at 608 to an open position shown at 610 in which the opposite end of the cover 210 (the end of the cover 210 distal from the slotted bracket 228D which is not visible in FIG. 6) is elevated relative to the first end of the cover 210. As discussed above, movement of slotted bracket 228D is imparted to 228B by the connecting rod 234A so that the slotted brackets 228B and 228D on the same lateral side move in concert.

An axis 612 shows that the link 230 generally remains in a same longitudinal position as the slotted bracket 228D is translated from right (the open position shown at 606) to the middle (closed position shown at 608), and from the middle (closed position shown at 608) to the left (open position shown at 610). As the slotted bracket 228D is translated between the various positions, the slot 312 in the slotted bracket 228D allows the second pin located at the pivot 308 to slide vertically within the slot 312, while the pin 312 is restrained form moving in the longitudinal direction. Additionally, the second pin located at the pivot 308 may be pivotably coupled to the slotted bracket 228D and the slot 602, allowing the link 230 to rotate to open and close the cover 210 as the slotted bracket 228D slides relative to the link 230 and the frame of the vehicle body.

Figure 7:
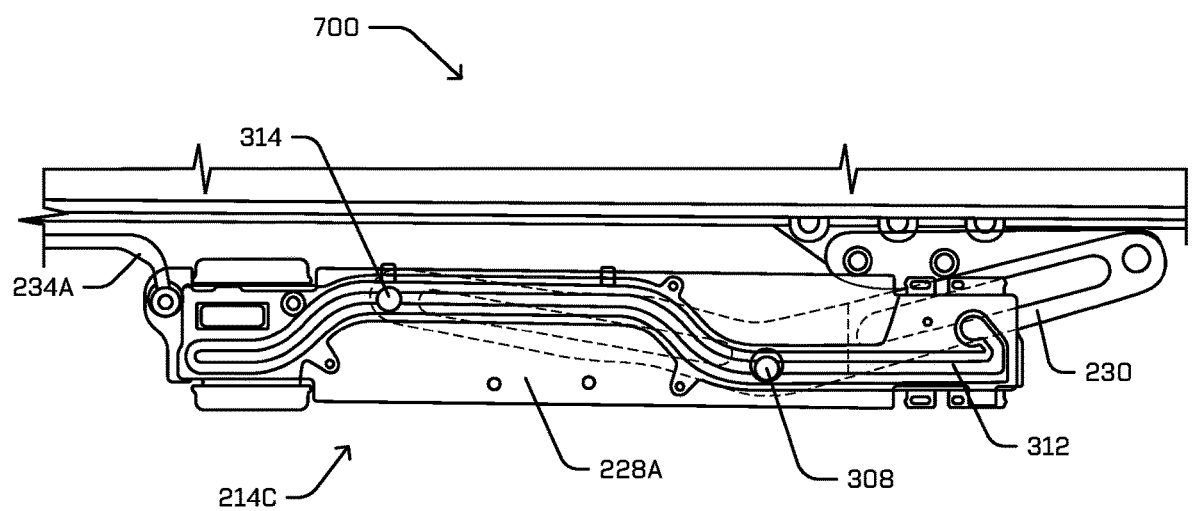
FIG. 7 is an example system depicting an alternate view of a linkage of the multi-directional roof cover system of FIG. 2 in accordance with embodiments of the disclosure.

FIG. 7 is an example system 700 depicting a linkage 214C from a side opposite that shown in FIG. 6. That is, the linkage 214C is shown from a view facing the slotted bracket 228A with the link 230 positioned behind the slotted bracket 228A. The first pin 314 and the second pin located at the pivot 308 protrude through the slot 312 from the link 230. The first pin 314 and the second pin located at the pivot 308 may slide through the slot 312 as the slotted bracket 228A is pushed and/or pulled by the cable 226.

Figure 8:
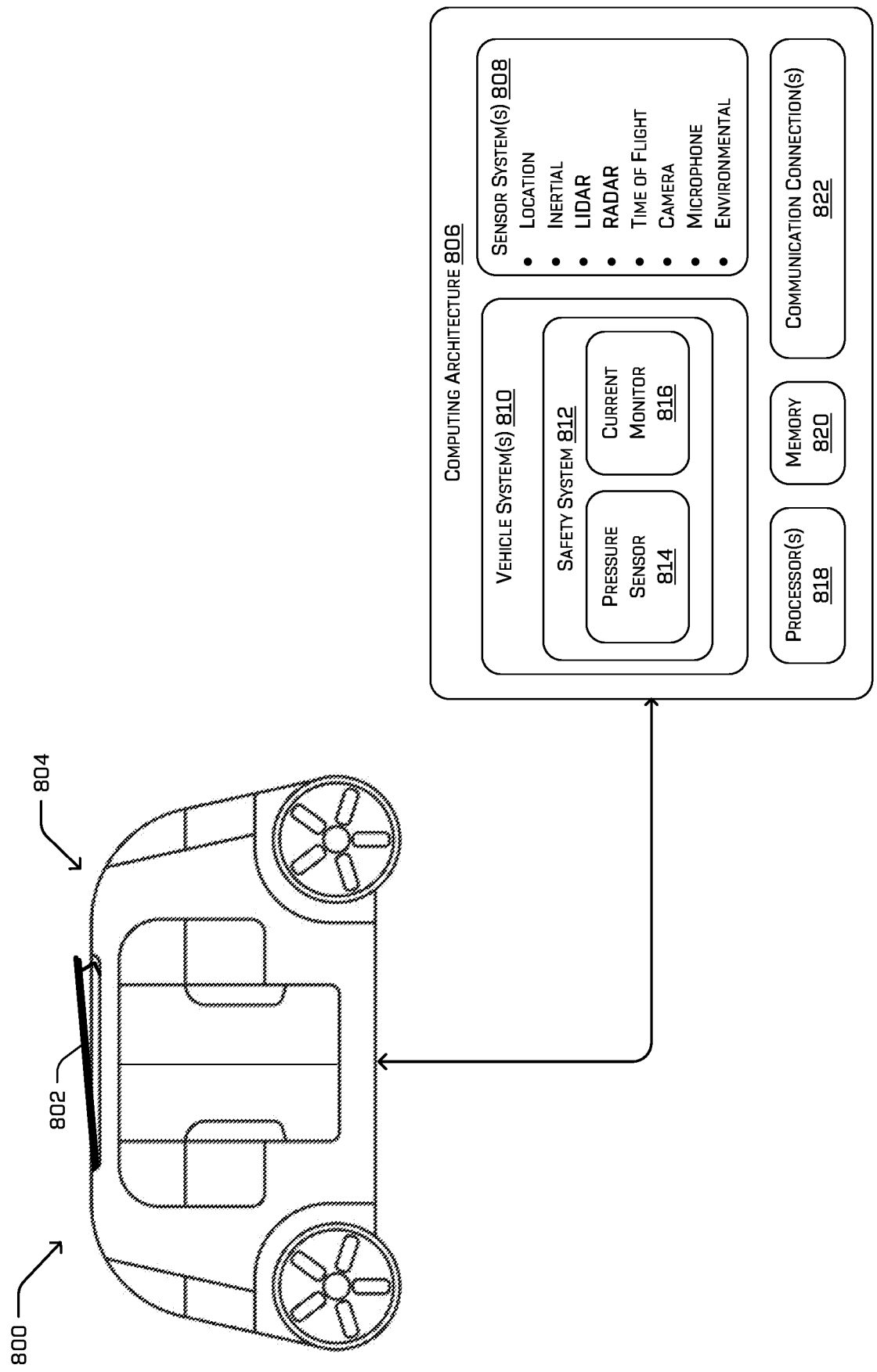
FIG. 8 is a side view of an example system including a multi-directional roof cover system mounted to a vehicle in an open position, in accordance with embodiments of the disclosure.

FIG. 8 is a side view of an example system 800 including a multi-directional roof cover system 802 mounted to a vehicle 804 in an open position. Although pictured in a single open position, the multi-directional roof cover system 802 may be configured to tilt in at least one other direction to provide a vent opening in a roof of the vehicle 804, along with being configured to close as described above. FIG. 8 also illustrates an example computing architecture 806 of the vehicle 804.

The computing architecture 806 includes one or more sensor systems 808. In some examples, the sensor system(s) 808 include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.) time of flight sensors, microphones, wheel encoders, environment sensors (e.g., temperature sensors, humidity sensors, light sensors, pressure sensors, wind speed sensors, etc.), etc. The sensor system(s) 808 can include multiple instances of each of these or other types of sensors. For instance, the lidar sensors can include individual lidar sensors located at the corners, front, back, sides, and/or top of the vehicle 802. As another example, the camera sensors can include multiple cameras disposed at various locations about the exterior and/or interior of the vehicle 802.

The sensor system(s) 808 provide input directly to one or more vehicle systems 810. In some examples, the vehicle system(s) 810 may include a vehicle control system to control steering, propulsion, braking, and/or communication systems of the vehicle 804. As shown, the vehicle system(s) 810 include a safety system 812 for the multi-directional roof cover system 802 to prevent the cover from closing and/or opening based on conditions detected by a touch sensor 814 and/or a current monitor 816, for instance. The pressure sensor 814 may be disposed along at least a portion of a perimeter of an opening of the multi-directional roof cover system 802, such as to detect an object in contact with the opening and prevent the cover from closing on the object. The touch sensor 814 may comprise one or multiple sensors, such as pressure sensors, strain gauges, capacitive touch sensors, or other sensors, configured to detect contact or pressure around at least a portion of a perimeter of the opening. The current monitor 816 may measure a current applied to a motor (e.g., motor 218) of the multi-directional roof cover system 802 to detect overcurrent conditions such as may be the case if the opening is obstructed or an object is resisting motion of the cover. Additionally or alternatively, the safety system 816 may receive input from one or more of the sensor system(s) 808 of the vehicle (e.g., one or more cameras or motion sensors in a passenger compartment of the vehicle) indicating obstructions of and/or motion in the vicinity of the opening, and actuate the cover of the multi-directional roof cover system 802 accordingly. Additionally, in some examples, such as when the vehicle 804 is an autonomous vehicle, the vehicle systems 814 may also include a localizer system to estimate a change in position of the vehicle 804 over time, a perception system to perform object detection and/or classification, and/or a planner system to determine routs and/or trajectories to use to control the vehicle.

The computing architecture 806 also includes one or more processors 818 and memory 820 communicatively coupled with the one or more processors 818. The processor(s) 818 may be any suitable processor capable of executing instructions to implement the vehicle system(s) 814. By way of example and not limitation, the processor(s) 818 may comprise one or more Central Processing Units (CPUs), Graphics Processing Units (GPUs), Electronic Control Unit (ECU), vehicle controller, or any other device or portion of a device that processes electronic data from registers and/or memory to transform that electronic data into other electronic data that may be stored in registers and/or memory.

Memory 820 is an example of non-transitory computer-readable media. Memory 820 may store an operating system and one or more software applications, instructions, programs, and/or data to implement the methods described herein and the functions attributed to the various systems. In various implementations, the memory 820 may be implemented using any suitable memory technology, such as static random access memory (SRAM), synchronous dynamic RAM (SDRAM), nonvolatile/Flash-type memory, or any other type of memory capable of storing information.

The computing architecture 806 also includes one or more communication connections 822 that enable communication by the vehicle with one or more other local or remote computing devices. The communications connection(s) 822 include physical and/or logical interfaces for connecting the computing architecture 806 to another computing device or a network. For example, the communications connection(s) 822 may enable cellular communication, WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

Example Process of Operating a Multi-Directional Roof Cover System

Figure 9:
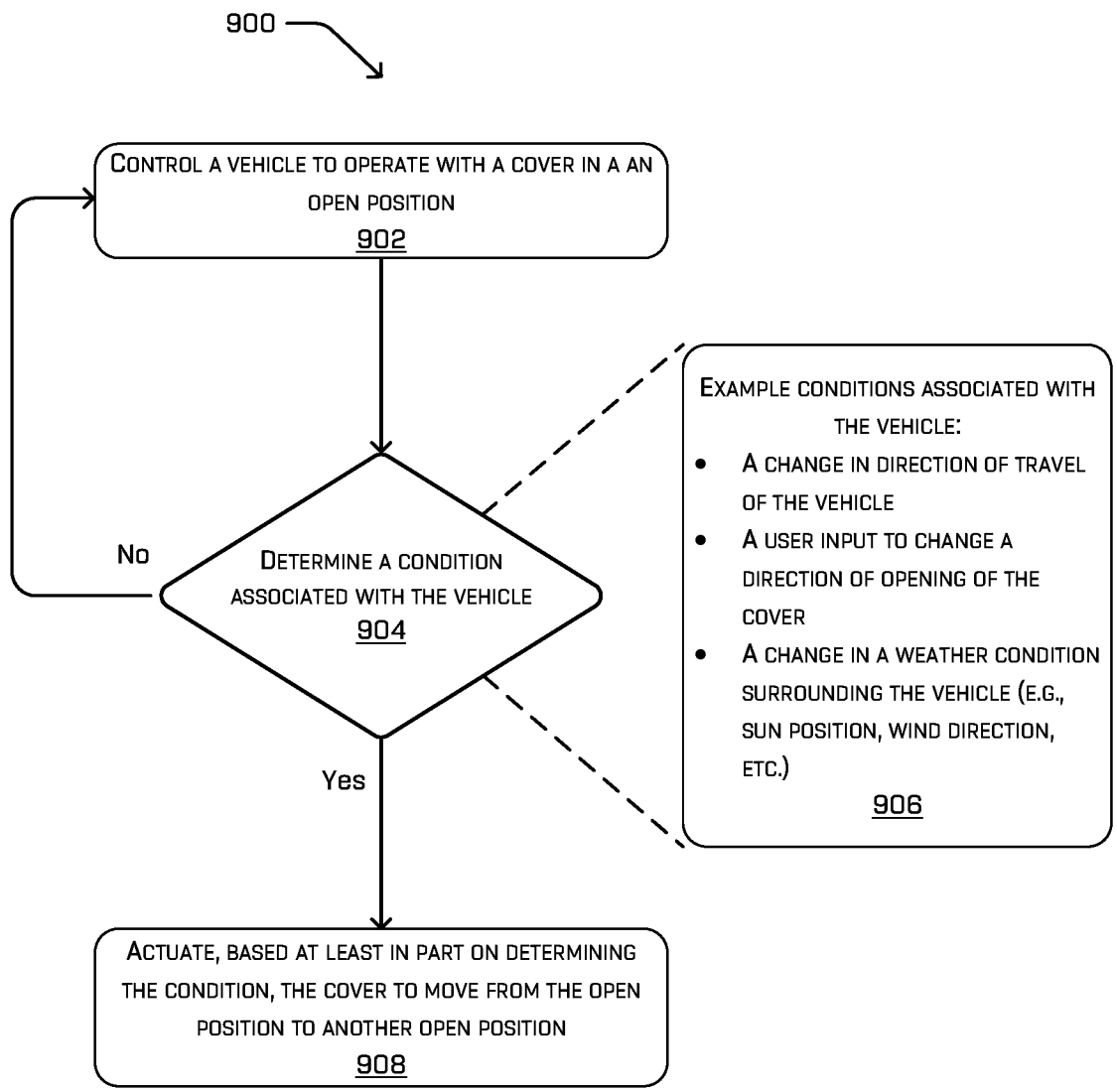
FIG. 9 is a flowchart illustrating an example method of operating a multi-directional roof cover system from a first open position to a second open position, in accordance with embodiments of the disclosure.

FIG. 9 is a flowchart illustrating an example method 900 of operating a multi-directional roof cover system from a first open position to a second open position. The method 900 is described with reference to the multi-directional roof cover system of FIG. 1 for convenience and ease of understanding. However, the method 900 is not limited to being performed using the multi-directional roof cover system of FIG. 1 and may be implemented using any of the other multi-directional roof cover systems described in this application, as well as multi-directional roof cover systems other than those described herein. Moreover, the multi-directional roof cover systems described herein are not limited to performing the method 900.

At operation 902, a vehicle is controlled to operate with a cover, such as the cover 106, in an open position. The vehicle may be controlled to operate in a first mode in which a first end of a compartment of the vehicle is a leading end of the compartment with respect to a direction of travel of the vehicle. Further, in the first mode a second end of the compartment (e.g., opposite the first end) is a trailing end of the compartment with respect to a direction of travel of the vehicle. In the first mode, the first open position of the cover 106 may include a first end of the cover proximate the first end of the compartment to be raised relative to a second end of the cover proximate the second end of the compartment. In other words, the first mode may provide a vent opening 110A facing away from a direction of travel 114A of the vehicle, although other examples are also contemplated, including providing the open position when the vehicle is stopped.

At operation 904, a condition associated with the vehicle is determined. The condition may be detected by one or more sensors associated with the vehicle, such as the one or more lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.) time of flight sensors, microphones, wheel encoders, environment sensors (e.g., temperature sensors, humidity sensors, light sensors, pressure sensors, wind speed sensors, etc.), etc. described above. Alternatively or additionally, the condition associated with the vehicle may be determined by the vehicle control system described above, which controls steering, propulsion, braking, safety systems, communication systems, the vehicle localizer system, the perception system, and/or the planner system.

In some cases, the condition associated with the vehicle is determined to be unchanged. For example, the condition of the vehicle may be determined to be maintenance of a generally same direction of travel of the vehicle, and thus the vehicle continues to be controlled to operate with the cover 106 in the first open position. In another example, the condition of the vehicle may be determined to be a weather condition that continues to lack precipitation, and thus the vehicle continues to be controlled to operate with the cover 106 in the first open position. In these circumstances, the determination at operation 904 may return to operation 902 to control the vehicle to operate with the cover in the open position (e.g., following the "no" path).

However, as indicated by block 906, the condition associated with the vehicle may be determined to include a condition such as a change in direction of travel of the vehicle, a user input to change a direction of opening of the cover, a change in a weather condition surrounding the vehicle, or the like. Based on determining such a condition associated with the vehicle, at operation 9708, the cover is actuated to move from one open position to another open position based on determining the condition (e.g., following the "yes" path). For example, the vehicle may be controlled to operate in a second mode, causing the second end of the cover 106 (e.g., proximate the second end of the compartment of the vehicle) to be raised relative to the first end of the cover. In the second mode, the second end of the compartment may be a leading end of the compartment and the first end of the compartment a trailing end of the compartment with respect to a direction of travel of the vehicle. Therefore, the second mode may provide a vent opening 110B facing away from a direction of travel 114B of the vehicle, automatically in response to determining a change in the direction of travel of the vehicle. In one example, the cover 106 may also be actuated to move from the first open position to the second open position based on a detection of a change in sun position relative to the vehicle, such as to shade the interior compartment of the vehicle. In yet another example, the cover 106 may be actuated to move from the first open position to the second open position based on wind direction relative to the vehicle, such as to prevent wind gusts from entering the interior compartment of the vehicle.

Figure 10:
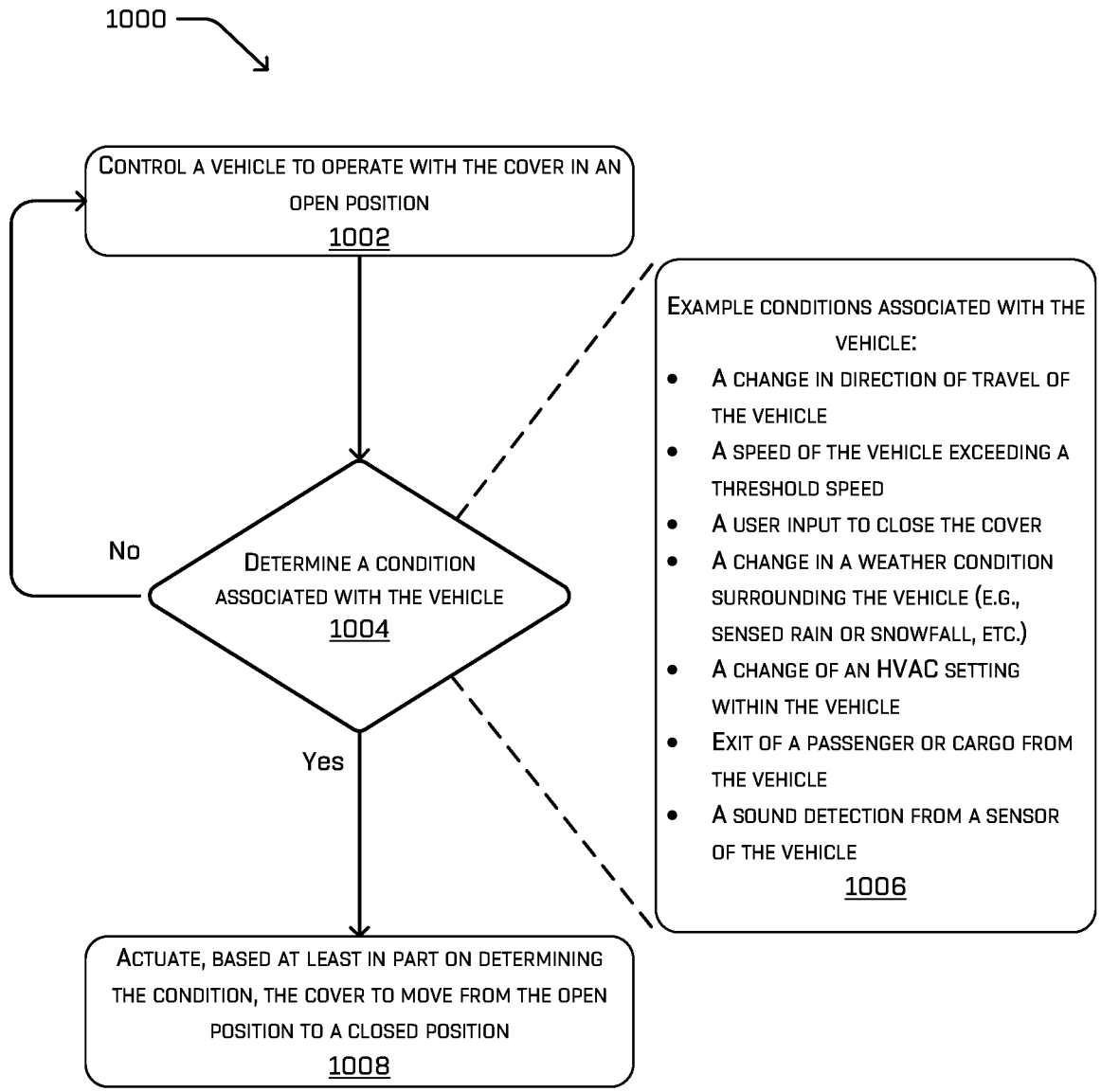
FIG. 10 is a flowchart illustrating an example method of operating a multi-directional roof cover system from an open position to a closed position, in accordance with embodiments of the disclosure.

FIG. 10 is a flowchart illustrating an example method 1000 of operating a multi-directional roof cover system from an open position to a closed position. The method 1000 is described with reference to the multi-directional roof cover system of FIG. 1 for convenience and ease of understanding. However, the method 1000 is not limited to being performed using the multi-directional roof cover system of FIG. 1 and may be implemented using any of the other multi-directional roof cover systems described in this application, as well as multi-directional roof cover systems other than those described herein. Moreover, the multi-directional roof cover systems are not limited to performing the method 1000.

At operation 1002, a vehicle is controlled to operate with a cover, such as the cover 106, in an open position. In the open position, a trailing end of the cover 106 may be raised relative to a leading end of the cover, relative to a direction of travel of the vehicle. In other words, the cover may be actuated to provide a vent opening 110A facing away from a direction of travel 114A of the vehicle, although other examples are also considered, including providing the open position when the vehicle is stopped.

At operation 1004, a condition associated with the vehicle is determined. The condition may be detected by one or more sensors associated with the vehicle, such as the one or more lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.) time of flight sensors, microphones, wheel encoders, environment sensors (e.g., temperature sensors, humidity sensors, light sensors, pressure sensors, wind speed sensors, etc.), etc. described above. Alternatively or additionally, the condition associated with the vehicle may be determined by the vehicle control system described above, which controls steering, propulsion, braking, safety systems, communication systems, the vehicle localizer system, the perception system, and/or the planner system. In one example, the condition associated with the vehicle may be determined by a touch sensor disposed along a perimeter of an opening of the multi-directional roof cover system 104, and/or a current monitor integrated with a motor of the multi-directional roof cover system to detect overcurrent conditions.

In some scenarios, the condition associated with the vehicle may be determined to be unchanged, and/or a safety alert from a sensor of the vehicle is detected. For example, the condition may be a direction of travel of the vehicle that is determined to be approximately unchanged, and thus the multi-directional roof cover system 104 continues to be controlled to operate with the cover 106 in the open position. In another example, the condition may be an overcurrent detection from a current sensor integrated with a motor (e.g., motor 218) of the multi-directional roof cover system 104 indicating that an object is resisting motion of the cover. In this example, the multi-directional roof cover system 104 continues to be controlled to operate with the cover 106 in the open position. In these circumstances, the determination at operation 1004 may return to operation 1002 to control the vehicle to operate with the cover in the open position (e.g., following the "no" path).

However, as indicated by block 1006, the condition associated with the vehicle may be determined to include a condition such as a change in a direction of travel of the vehicle, a speed of the vehicle exceeding a threshold speed, a user input to close the cover 106, a change in a weather condition surrounding the vehicle (e.g., sensed rain or snowfall, etc.), a change of an HVAC setting within the vehicle, exit of a passenger or cargo from an interior compartment of the vehicle, a sound detection from a sensor of the vehicle, the vehicle being powered off, or the like. At operation 1008, the cover is actuated, based at least in part on determining the condition, to move from the open position to a closed position (e.g., following the "yes" path). In some examples, the vehicle may receive conflicting instructions. For example, the vehicle may receive an instruction to close the cover (or move the cover from one open position to another) while also receiving (concurrently or sequentially) an instruction not to close the cover. In that case, the vehicle may prioritize the instructions based on one or more factors such as passenger safety, prevent damage to the vehicle, passenger comfort, vehicle performance, or the like. For instance, if an instruction to close the cover is received while also receiving (concurrently or sequentially) a signal from a safety system of the vehicle that the cover is obstructed, the vehicle may prioritize the signal from the safety system of the vehicle so as not to close the cover on the obstructions (e.g., a passenger's hand or appendage). In another example, if an instruction to open the cover is received while the vehicle is traveling at or above a threshold speed, the vehicle may receive (concurrently or sequentially) an instruction from a vehicle computing device not to open the cover in order to prevent damage to the vehicle that might be caused by opening the cover at a high rate of speed. In some examples, performance of the vehicle may be changed based on one or more conflicting signals. For instance, if a vehicle changes direction of travel from a first direction (e.g., direction 114A in FIG. 1) to a second direction (direction 114B in FIG. 1) opposite the first direction, an instruction may indicate to move the cover from one open position (e.g., the second position illustrated in FIG. 1) to another open position (e.g., the third position illustrated in FIG. 1). However, if a signal is received (concurrently or sequentially) from a safety system of the vehicle indicating that the cover is obstructed from moving from the one open position (the second position) to the other open position (the third position), the cover may be maintained in the one open position (the second position). In that case, the vehicle may still be allowed to travel in the second direction (114B) with the cover in the one position (the second position), but a speed of the vehicle may be limited to prevent damage to the vehicle.

For example, a threshold speed (e.g., 30 miles per hour, 40 miles per hour, 50 miles per hour, etc.) may be set to cause the cover 106 to close automatically when a speed of the vehicle is determined to exceed the threshold. Alternatively or additionally, the condition may relate to a weather condition surrounding the vehicle, causing the cover 106 to close when precipitation is detected and/or when precipitation is anticipated, such as by a weather forecast. Further, a change in an HVAC setting may cause the cover to close, such as by a user input to turn air conditioning or heating on, and/or a threshold temperature being reached within an interior compartment of the vehicle. Additionally, the cover 106 may close in response to a detection of sound from a sensor of the vehicle, such as a decibel level threshold of the environment surrounding the vehicle being exceeded in order to keep a pleasant environment within the vehicle.

Figure 11:
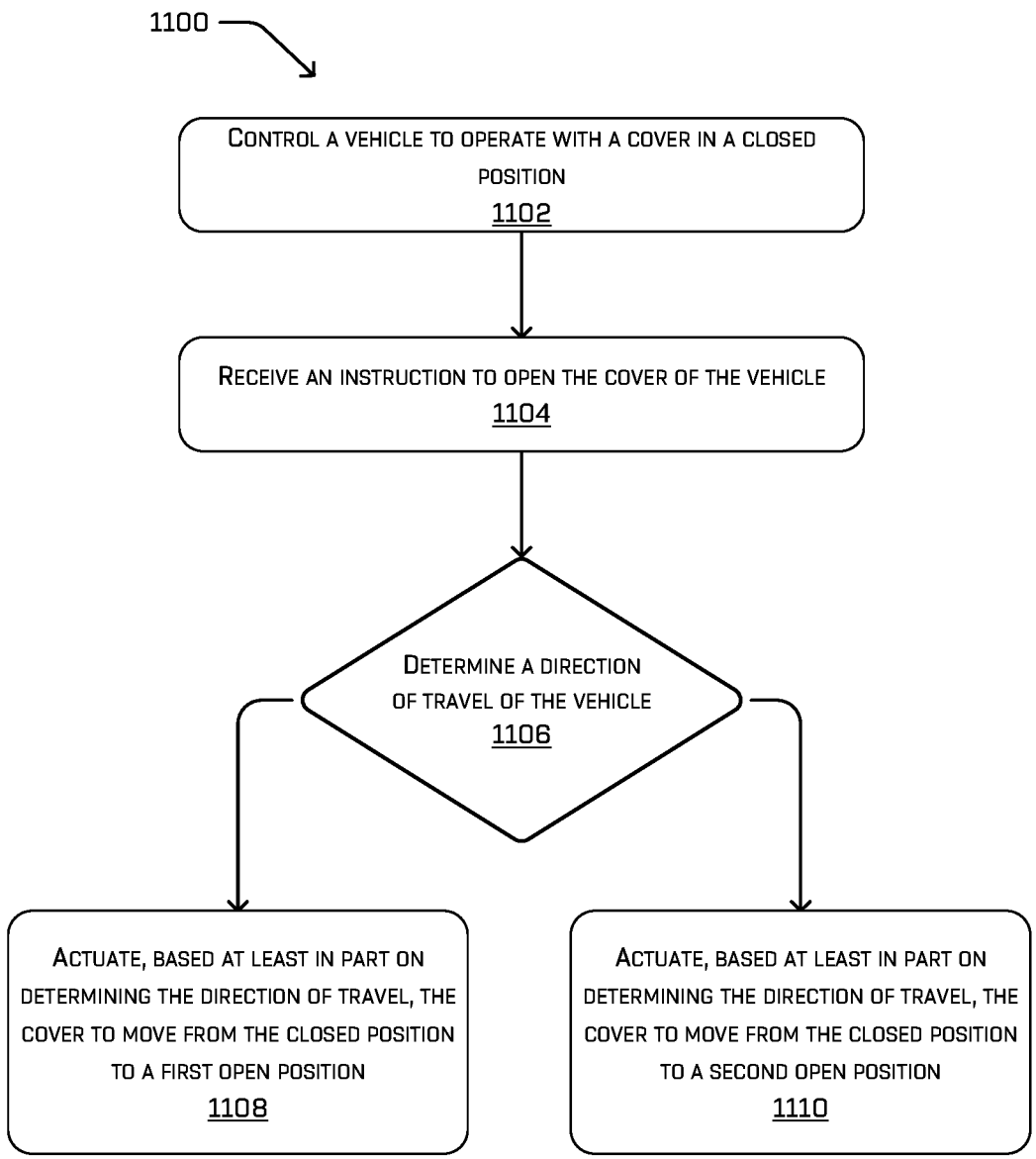
FIG. 11 is a flowchart illustrating an example method of operating a multi-directional roof cover system from a closed position to an open position, in accordance with embodiments of the disclosure.

FIG. 11 is a flowchart illustrating an example method 1100 of operating a multi-directional roof cover system from a closed position to an open position. The method 1100 is described with reference to the multi-directional roof cover system of FIG. 1 for convenience and ease of understanding. However, the method 1100 is not limited to being performed using the multi-directional roof cover system of FIG. 1 and may be implemented using any of the other multi-directional roof cover systems described in this application, as well as multi-directional roof cover systems other than those described herein. Moreover, the multi-directional roof cover systems are not limited to performing the method 1100.

At operation 1102, a vehicle is controlled to operate with a cover, such as the cover 106, in a closed position. At operation 1104, an instruction is received to open the cover of the vehicle. The instruction may be received from a user via a user interface within an interior compartment of the vehicle, a user outside of the vehicle (e.g., from a teleoperations computing device remote from the vehicle), from a user device (e.g., mobile device) inside or outside the vehicle, or may be received based on a detected condition associated with the vehicle such as the interior compartment exceeding a threshold temperature, for instance.

At operation 1106, a direction of travel of the vehicle is determined. Determining a direction of travel of the vehicle may include determining a leading end of a compartment of the vehicle and/or determining a trailing end of the compartment of the vehicle relative to a direction of travel of the vehicle. Then, at operation 1108, the cover 106 may be actuated to move from the closed position to a first open position based at least in part on determining the direction of travel. Alternatively, at operation 1110, the cover 106 may be actuated to move from the closed position to a second open position based at least in part on determining the direction of travel.

For example, the first open position may correspond to a first end of the cover 106 being raised relative to a second end of the cover opposite the first end. Similarly, the second open position may correspond to the second end of the cover 106 being raised relative to the first end of the cover. By determining a direction of travel of the vehicle, a vent opening caused by raising either the first end of the cover or the second end of the cover may be configured to face away from the direction of travel of the vehicle, thus preventing high forces of air from pressing against the cover 106.

Example Clauses

A. A vehicle comprises: a body comprising a compartment having a first end, a second end opposite the first end, and a top, the compartment having an opening in the top; a cover movably coupled to the body to selectively cover the opening in the compartment, the cover having: a first end proximate the first end of the compartment; a second end proximate the second end of the compartment; lateral edges connecting the first end and the second end; and linkages coupling the lateral edges to the body; the cover being actuatable between: a first position in which the cover is closed and covers the opening in the compartment; a second position in which the cover is open and the first end of the cover is raised relative to the second end of the cover; and a third position in which the cover is open and the second end of the cover is raised relative to the first end of the cover.

B. The vehicle of example A, further comprising: one or more processors and memory, the memory storing instructions that, when executed by the one or more processors, configure the vehicle to perform operations comprising: controlling the vehicle to operate in a first mode, in which the first end of the compartment is a leading end of the compartment and the second end of the compartment is a trailing end of the compartment and the cover is in the third position; actuating the cover to the third position; controlling the vehicle to operate in a second mode, in which the second end of the compartment is the leading end of the compartment and the first end of the compartment is the trailing end of the compartment; determining a change in a direction of travel of the vehicle; and based at least in part on determining the change in direction, actuating the cover to move from the third position to the second position.

C. The vehicle of any one of examples A or B, further comprising: one or more processors and memory, the memory storing instructions that, when executed by the one or more processors, configure the vehicle to perform operations comprising: controlling the vehicle to operate with the cover in one of the second position or the third position; detecting a condition associated with the vehicle; and actuating, based at least in part on detecting the condition, the cover to move from the one of the second position or the third position to the first position.

D. The vehicle of any one of examples A-C, wherein the condition comprises at least one of: precipitation; a speed of the vehicle exceeds a threshold speed; a direction of travel of the vehicle; a setting of a heating, ventilation or air conditioning (HVAC) system of the vehicle; receipt of a command from a passenger of the vehicle; or exit of a passenger from the vehicle.

E. The vehicle of any one of examples A-D, further comprising: a motor coupled to one or more of the linkages to selectively actuate the cover to move between the first position, the second position, and the third position; and a safety system communicatively coupled to the motor to prevent the cover from being moved from the second position or the third position to the first position while the opening is obstructed, the safety system comprising at least one of: a touch sensor disposed along at least a perimeter of the opening; a current monitor coupled to the motor to measure current applied to the motor to actuate the cover to move; or a camera disposed within an interior of the vehicle and positioned to capture images of the opening.

F. The vehicle of any one of examples A-D, further comprising a single motor coupled to one or more of the linkages to selectively actuate the cover to move between the first position, the second position, and the third position.

G. The vehicle of any one of examples A-F, wherein the linkages comprise at least a first linkage and a second linkage disposed on a first lateral edge of the cover; the vehicle further comprising a connecting rod connecting the first linkage to the second linkage for movement in unison.

H. The vehicle of any one of examples A-G, wherein a linkage of the linkages comprises a slotted bracket movably coupled to the body, the slotted bracket configured to move along a track proximate a respective lateral edge of the cover, wherein: when the cover is in the first position, the slotted bracket is in a first position with respect to the linkage; when the cover is in the second position, the slotted bracket is in a second position with respect to the linkage; and when the cover is in the third position, the slotted brackets are in a third position with respect to the linkage.

I. The vehicle of example H, wherein: the linkage comprises an angled link including a first leg, a second leg, and a pivot disposed between the first leg and the second leg, the first leg being pivotably coupled to a lateral side of the cover, the second leg being pivotably and slidably coupled to the slotted bracket, and the pivot being pivotably coupled to the body of the vehicle, such that translation of the slotted bracket from the first position to the second position or the third position causes the first end of the cover or the second end of the cover, respectively, to move vertically relative to the body.

J. A method comprising: causing a cover to be in one of a first position in which the cover is closed and covers an opening in a body, a second position in which the cover is open and the first end of the cover is raised relative to the second end of the cover, or a third position in which the cover is open and the second end of the cover is raised relative to the first end of the cover, the cover having a first end and a second end; detecting a condition associated with the body; and actuating, based at least in part on detecting the condition, the cover to move to a different one of the first position, the second position, or the third position.

K. The method of example J, wherein: the body comprises a compartment of a vehicle; the causing comprises causing the vehicle to operate with the cover in one of the second position or the third position; the condition comprises a change in direction of travel of the vehicle; and the actuating includes actuating the cover to move from the one of the second position or the third position to the other of the second position or the third position.

L. The method of any one of examples J or K, wherein: the causing includes causing the cover to be in one of the second position or the third position; the condition comprises at least one of: precipitation; a speed of the body exceeds a threshold speed; a direction of travel of the body; a setting of a heating, ventilation or air conditioning (HVAC) system associated with the body; receipt of a command from a user; and the actuating includes actuating the cover to move from the one of the second position or the third position to the first position.

M. The method of any one of examples J-L, wherein the causing includes causing the cover to be in one of the second position or the third position, the method further comprising: receiving a command to move the cover from the second position or the third position to the first position; determining an obstruction in the opening based on a signal from at least one of: a touch sensor disposed along at least a perimeter of the opening; a current monitor coupled to the motor to measure a current applied to the motor to actuate the cover to move; or a camera disposed within an interior of the body and positioned to capture images of the opening; and controlling the motor to prevent the cover from being moved from the second position or the third position to the first position based on determining the obstruction.

N. The method of any one of examples J-M, wherein: the actuating further comprises controlling a motor to push or pull a cable which is coupled to a linkage that couples the cover to the body, and the pushing or pulling the cable causes the cover to move from the one of the first position, the second position, or the third position to the different one of the first position, the second position, or the third position.

O. The method of any one of examples J-N, wherein the actuating further comprises moving a slotted bracket along a track proximate lateral edges of the cover, the slotted bracket being movably coupled to the body, wherein the slotted bracket is actuatable between: a first position in which the slotted bracket is in a middle position; a second position in which the slotted bracket is in a first end position; and a third position in which the slotted bracket is in a second end position.

P. One or more non-transitory computer-readable media storing instructions, that when executed, configure a system to perform operations comprising: causing a cover to be in one of a first position in which the cover is closed and covers an opening in a body, a second position in which the cover is open and the first end of the cover is raised relative to the second end of the cover, or a third position in which the cover is open and the second end of the cover is raised relative to the first end of the cover, the cover having a first end and a second end; detecting a condition associated with the body; and actuating, based at least in part on detecting the condition, the cover to move to a different one of the first position, the second position, or the third position.

Q. The one or more non-transitory computer-readable media of example P, wherein: the body comprises a compartment of a vehicle; the causing comprises causing a vehicle to operate with the cover in one of the second position or the third position; the condition comprises a change in direction of travel of the vehicle; and the actuating includes actuating the cover to move from the one of the second position or the third position to the other of the second position or the third position.

R. The one or more non-transitory computer-readable media of any one of examples P or Q, wherein the causing comprises causing a vehicle to operate with the cover in one of the second position or the third position; the condition comprises at least one of: precipitation; a speed of the vehicle exceeds a threshold speed; a direction of travel of the vehicle; a setting of a heating, ventilation or air conditioning (HVAC) system of the vehicle; receipt of a command from a passenger of the vehicle; or exit of a passenger from the vehicle; and the actuating includes actuating the cover to move from the one of the second position or the third position to the first position.

S. The one or more non-transitory computer-readable media of any one of examples P-R, wherein the causing comprises causing a vehicle to operate with the cover, and the operations further comprising: receiving a command to move the cover from the second position or the third position to the first position; determining an obstruction in the opening based on a signal from at least one of: a touch sensor disposed along at least a perimeter of the opening; a current monitor coupled to the motor to measure a current applied to the motor to actuate the cover to move; or a camera disposed within an interior of the vehicle and positioned to capture images of the opening; and controlling the motor to prevent the cover from being moved from the second position or the third position to the first position based on determining the obstruction.

T. The one or more non-transitory computer-readable media of any one of examples P-S, wherein: the actuating further comprises controlling a motor to push or pull a cable which is coupled to a linkage that couples the cover to a vehicle, and the pushing or pulling the cable causes the cover to move from the one of the first position, the second position, or the third position to the different one of the first position, the second position, or the third position.

While the example clauses described above are described with respect to one particular implementation, it should be understood that, in the context of this document, the content of the example clauses can also be implemented via a method, device, system, a computer-readable medium, and/ or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
   a body comprising a compartment having a first end, a second end opposite the first end, and a top, the compartment having an opening in the top;
   a cover movably coupled to the body to selectively cover the opening in the compartment, the cover having:
      a first end proximate the first end of the compartment;
      a second end proximate the second end of the compartment;
      lateral edges connecting the first end and the second end; and
      linkages coupling the lateral edges to the body;
   the cover being actuatable between:
      a first position in which the cover is closed and covers the opening in the compartment;
      a second position in which the cover is open and the first end of the cover is raised relative to the second end of the cover; and
      a third position in which the cover is open and the second end of the cover is raised relative to the first end of the cover; and
   one or more processors and memory, the memory storing instructions that, when executed by the one or more processors, configure the vehicle to perform operations comprising:
      controlling the vehicle to operate with the cover in one of the second position or the third position;
      detecting a condition associated with the vehicle; and
      actuating, based at least in part on detecting the condition, the cover to move from the one of the second position or the third position to the first position.

2. The vehicle of claim 1, the operations further comprising:
   controlling the vehicle to operate in a first mode, in which the first end of the compartment is a leading end of the compartment and the second end of the compartment is a trailing end of the compartment and the cover is in the third position;
   actuating the cover to the third position;
   controlling the vehicle to operate in a second mode, in which the second end of the compartment is the leading end of the compartment and the first end of the compartment is the trailing end of the compartment;
   determining a change in a direction of travel of the vehicle; and
   based at least in part on determining the change in direction, actuating the cover to move from the third position to the second position.

3. The vehicle of claim 1, wherein the condition comprises at least one of:
   precipitation;
   a speed of the vehicle exceeds a threshold speed;
   a direction of travel of the vehicle;
   a setting of a heating, ventilation or air conditioning (HVAC) system of the vehicle;
   receipt of a command from a passenger of the vehicle; or
   exit of a passenger from the vehicle.

4. The vehicle of claim 1, further comprising:
   a motor coupled to one or more of the linkages to selectively actuate the cover to move between the first position, the second position, and the third position; and
   a safety system communicatively coupled to the motor to prevent the cover from being moved from the second position or the third position to the first position while the opening is obstructed, the safety system comprising at least one of:
      a touch sensor disposed along at least a perimeter of the opening;
      a current monitor coupled to the motor to measure current applied to the motor to actuate the cover to move; or
      a camera disposed within an interior of the vehicle and positioned to capture images of the opening.

5. The vehicle of claim 1, further comprising a single motor coupled to one or more of the linkages to selectively actuate the cover to move between the first position, the second position, and the third position.

23

6. The vehicle of claim 5, wherein the linkages comprise at least a first linkage and a second linkage disposed on a first lateral edge of the cover;
the vehicle further comprising a connecting rod connecting the first linkage to the second linkage for movement in unison.

7. The vehicle of claim 1, wherein a linkage of the linkages comprises a slotted bracket movably coupled to the body, the slotted bracket configured to move along a track proximate a respective lateral edge of the cover, wherein:
when the cover is in the first position, the slotted bracket is in a first position with respect to the linkage;
when the cover is in the second position, the slotted bracket is in a second position with respect to the linkage; and
when the cover is in the third position, the slotted brackets are in a third position with respect to the linkage.

8. The vehicle of claim 7, wherein:
the linkage comprises an angled link including a first leg, a second leg, and a pivot disposed between the first leg and the second leg,
the first leg being pivotably coupled to a lateral side of the cover,
the second leg being pivotably and slidably coupled to the slotted bracket, and
the pivot being pivotably coupled to the body of the vehicle,
such that translation of the slotted bracket from the first position to the second position or the third position causes the first end of the cover or the second end of the cover, respectively, to move vertically relative to the body.

9. A method comprising:
causing a cover to be in one of a first position in which the cover is closed and covers an opening in a body, a second position in which the cover is open and the first end of the cover is raised relative to the second end of the cover, or a third position in which the cover is open and the second end of the cover is raised relative to the first end of the cover, the cover having a first end and a second end;
detecting a condition associated with the body; and
actuating, based at least in part on detecting the condition, the cover to move to a different one of the first position, the second position, or the third position.

10. The method of claim 9, wherein:
the body comprises a compartment of a vehicle; the causing comprises causing the vehicle to operate with the cover in one of the second position or the third position;
the condition comprises a change in direction of travel of the vehicle; and
the actuating includes actuating the cover to move from the one of the second position or the third position to the other of the second position or the third position.

11. The method of claim 9, wherein:
the causing includes causing the cover to be in one of the second position or the third position;
the condition comprises at least one of:
precipitation;
a speed of the body exceeds a threshold speed;
a direction of travel of the body;
a setting of a heating, ventilation or air conditioning (HVAC) system associated with the body;
receipt of a command from a user; and

24 the actuating includes actuating the cover to move from the one of the second position or the third position to the first position.

12. The method of claim 9, wherein the causing includes causing the cover to be in one of the second position or the third position, the method further comprising:
receiving a command to move the cover from the second position or the third position to the first position;
determining an obstruction in the opening based on a signal from at least one of:
a touch sensor disposed along at least a perimeter of the opening;
a current monitor coupled to the motor to measure a current applied to the motor to actuate the cover to move; or
a camera disposed within an interior of the body and positioned to capture images of the opening; and
controlling the motor to prevent the cover from being moved from the second position or the third position to the first position based on determining the obstruction.

13. The method of claim 9, wherein:
the actuating further comprises controlling a motor to push or pull a cable which is coupled to a linkage that couples the cover to the body, and
the pushing or pulling the cable causes the cover to move from the one of the first position, the second position, or the third position to the different one of the first position, the second position, or the third position.

14. The method of claim 9, wherein the actuating further comprises moving a slotted bracket along a track proximate lateral edges of the cover, the slotted bracket being movably coupled to the body, wherein the slotted bracket is actuatable between:
a first position in which the slotted bracket is in a middle position;
a second position in which the slotted bracket is in a first end position; and
a third position in which the slotted bracket is in a second end position.

15. One or more non-transitory computer-readable media storing instructions, that when executed, configure a system to perform operations comprising:
causing a cover to be in one of a first position in which the cover is closed and covers an opening in a body, a second position in which the cover is open and the first end of the cover is raised relative to the second end of the cover, or a third position in which the cover is open and the second end of the cover is raised relative to the first end of the cover, the cover having a first end and a second end;
detecting a condition associated with the body; and
actuating, based at least in part on detecting the condition, the cover to move to a different one of the first position, the second position, or the third position.

16. The one or more non-transitory computer-readable media of claim 15, wherein:
the body comprises a compartment of a vehicle;
the causing comprises causing a vehicle to operate with the cover in one of the second position or the third position;
the condition comprises a change in direction of travel of the vehicle; and
the actuating includes actuating the cover to move from the one of the second position or the third position to the other of the second position or the third position.

17. The one or more non-transitory computer-readable media of claim 15, wherein the causing comprises causing a vehicle to operate with the cover in one of the second position or the third position;
  the condition comprises at least one of:
    precipitation;
    a speed of the vehicle exceeds a threshold speed;
    a direction of travel of the vehicle;
    a setting of a heating, ventilation or air conditioning (HVAC) system of the vehicle;
    receipt of a command from a passenger of the vehicle; or
    exit of a passenger from the vehicle; and
  the actuating includes actuating the cover to move from the one of the second position or the third position to the first position.

18. The one or more non-transitory computer-readable media of claim 15, wherein the causing comprises causing a vehicle to operate with the cover, and the operations further comprising:
  receiving a command to move the cover from the second position or the third position to the first position;
  determining an obstruction in the opening based on a signal from at least one of:
    a touch sensor disposed along at least a perimeter of the opening;
    a current monitor coupled to the motor to measure a current applied to the motor to actuate the cover to move; or
    a camera disposed within an interior of the vehicle and positioned to capture images of the opening; and
  controlling the motor to prevent the cover from being moved from the second position or the third position to the first position based on determining the obstruction.

19. The one or more non-transitory computer-readable media of claim 15, wherein:
  the actuating further comprises controlling a motor to push or pull a cable which is coupled to a linkage that couples the cover to a vehicle, and
  the pushing or pulling the cable causes the cover to move from the one of the first position, the second position, or the third position to the different one of the first position, the second position, or the third position.

20. The one or more non-transitory computer-readable media of claim 15, wherein detecting the condition comprises receiving an indication of the condition from one or more sensors associated with the body, wherein the one or more sensors comprise at least one of:
  a lidar sensor;
  a radar sensor;
  an ultrasonic transducer;
  a sonar sensor;
  a location sensor;
  an inertial sensor;
  an accelerometer;
  a magnetometer;
  a camera;
  a time of flight sensor;
  a microphone;
  a wheel encoder; or
  an environmental sensor.

* * * * *